US012640158B2

(12) United States Patent
Vaillancourt et al.

(10) Patent No.: US 12,640,158 B2
(45) Date of Patent: May 26, 2026

(54) METHOD AND DEVICE FOR UNIFIED TIME-DOMAIN / FREQUENCY DOMAIN CODING OF A SOUND SIGNAL

(71) Applicant: VOICEAGE CORPORATION, Town of Mount Royal (CA)

(72) Inventors: Tommy Vaillancourt, Sherbrooke (CA); Vladimir Malenovsky, Brno (CZ)

(73) Assignee: VOICEAGE CORPORATION, Town of Mount Royal (CA)

( * ) Notice: Subject to any disclaimer, the term of this patent is extended or adjusted under 35 U.S.C. 154(b) by 330 days.

(21) Appl. No.: 18/259,971

(22) PCT Filed: Jan. 5, 2022

(86) PCT No.: PCT/CA2022/050006
§ 371 (c)(1),
(2) Date: Jun. 29, 2023

(87) PCT Pub. No.: WO2022/147615
PCT Pub. Date: Jul. 14, 2022

(65) Prior Publication Data
US 2024/0321285 A1 Sep. 26, 2024

Related U.S. Application Data

(60) Provisional application No. 63/135,171, filed on Jan. 8, 2021.

(51) Int. Cl.
*G10L 19/12* (2013.01)
*G10L 19/008* (2013.01)
(Continued)

(52) U.S. Cl.
CPC ............ *G10L 19/12* (2013.01); *G10L 19/008* (2013.01); *G10L 19/22* (2013.01); *G10L 21/0232* (2013.01); *G10L 19/20* (2013.01)

(58) Field of Classification Search
CPC ....... G06F 3/16; G10L 19/22; G10L 21/0232; G10L 19/20; G10L 25/81; G10L 19/025; H04R 25/50; H04R 2225/43
(Continued)

(56) References Cited

U.S. PATENT DOCUMENTS 9,015,038 B2 * 4/2015 Vaillancourt ........... G10L 19/20 704/229
2005/0261892 A1 * 11/2005 Makinen ................. G10L 19/20 704/E19.042
(Continued)

FOREIGN PATENT DOCUMENTS

CN 101091108 A 12/2007
CN 101281749 A 10/2008
(Continued)

OTHER PUBLICATIONS

Ramprashad, "A Multimode Transform Predictive Coder (MTPC) for Speech and Audio", Speech Coding Proceedings, 1999 IEEE, XP010345557, Jun. 20, 1999, pp. 10-12.
(Continued)

*Primary Examiner* — Fan S Tsang
*Assistant Examiner* — Sean M Rinehart
(74) *Attorney, Agent, or Firm* — Fay Kaplun & Marcin, LLP

(57) ABSTRACT

A unified time-domain/frequency-domain coding method and device for coding an input sound signal comprise a classifier of the input sound signal into one of a plurality of sound signal categories comprising an unclear signal type category showing that the nature of the input sound signal is unclear. One of a plurality of coding sub-modes is selected for coding the input sound signal if the input sound signal is classified in the unclear signal type category. A mixed time-domain/frequency-domain encoder codes the input
(Continued)

sound signal using the selected coding sub-mode. The mixed time-domain/frequency-domain encoder comprises a selector of frequency bands and allocator of bits for selecting frequency bands to quantize and for distributing a bit budget available to quantization between the selected frequency bands. Corresponding sound signal decoder and decoding method are also provided.

36 Claims, 12 Drawing Sheets

(51) Int. Cl.
*G10L 19/20* (2013.01)
*G10L 19/22* (2013.01)
*G10L 21/0232* (2013.01)

(58) Field of Classification Search
USPC ........................................................ 700/94
See application file for complete search history.

(56) References Cited

U.S. PATENT DOCUMENTS

| | | | | |
|---|---|---|---|---|
| 2010/0004926 | A1 | 1/2010 | Neoran et al. | |
| 2010/0070284 | A1* | 3/2010 | Oh | G10L 19/22 704/500 |
| 2011/0002266 | A1* | 1/2011 | Gao | G10L 19/26 370/328 |
| 2011/0016077 | A1 | 1/2011 | Vasilache et al. | |
| 2011/0202337 | A1 | 8/2011 | Fuchs et al. | |
| 2012/0101813 | A1* | 4/2012 | Vaillancourt | G10L 19/08 704/500 |
| 2014/0108020 | A1 | 4/2014 | Sharma et al. | |
| 2014/0249807 | A1* | 9/2014 | Vaillancourt | G10L 19/08 704/207 |
| 2017/0223356 | A1* | 8/2017 | Sung | G10L 19/167 |
| 2020/0243100 | A1 | 7/2020 | Eksler | |

FOREIGN PATENT DOCUMENTS

| | | | |
|---|---|---|---|
| CN | 101393741 | A | 3/2009 |
| CN | 101615393 | A | 12/2009 |
| CN | 103282595 | A | 9/2013 |
| JP | 2011-514558 | | 5/2011 |
| JP | 2011-203737 | | 10/2011 |
| KR | 20070019739 | A | 2/2007 |
| WO | 2021/207825 | A1 | 10/2021 |

OTHER PUBLICATIONS

3GPP TS 26.445 V12 "Universal Mobile Telecommunications System (UMTS); LTE; EVS Codec Detailed Algorithmic Description", V.12.0.0, Nov. 5, 2014, pp. 1, 19-23, 132-442 and 443-618.
Ericsson et al., "New WID on EVS Codec Extension for Immersive Voice and Audio Services", 3GPP WG-SA4 Meeting #94, S4-170749, Jun. 26-30, 2017, 4 sheets.
ITU-T Recommendation G.718 "Frame error robust narrow-band and wideband embedded variable bit-rate coding of speech and audio from 8-32 kbit/s", Jun. 2008, 259 sheets.
Vaillancourt et al., "Inter-Tone Noise Reduction in a Low Bit Rate CELP Decoder" IEEE Proceedings of International Conference on Acoustics, Speech and Signal Processing (ICASSP), Apr. 2009, 4 sheets.
Eksler et al., "Transition Mode Coding for Source Controlled CELP Codecs", IEEE Proceedings of International Conference on Acoustics, Speech and Signal Processing (ICASSP), Mar.-Apr. 2008, 4 sheets.
Mittal et al., "Low Complexity Factorial Pulse Coding of MDCT Coefficients using Approximation of Combinatorial Functions", IEEE Proceedings of International Conference on Acoustics, Speech and Signal Processing (ICASSP), Apr. 2007, 4 sheets.

* cited by examiner

METHOD AND DEVICE FOR UNIFIED TIME-DOMAIN / FREQUENCY DOMAIN CODING OF A SOUND SIGNAL

PRIORITY CLAIM

The present application is a National Phase Application of PCT Application Serial No. PCT/CA2022/050006 filed Jan. 5, 2022; which claims priority to U.S. Provisional Patent Application Ser. No. 63/135,171 filed Jan. 8, 2021. The disclosures of the above applications are incorporated herewith by reference.

TECHNICAL FIELD

The present disclosure relates to unified time-domain/frequency-domain coding device and method using a mixed time-domain and frequency-domain coding mode for coding an input sound signal, and corresponding decoder device and decoding method.

In the present disclosure and the appended claims:

The term "sound" may be related to speech, generic audio signals such as music and reverberant speech, and any other sound.

BACKGROUND

A state-of-the-art conversational codec can represent with a very good quality a clean speech signal with a bitrate of around 8 kbps and approach transparency at a bitrate of 16 kbps. However, at bitrates below 16 kbps, low processing delay conversational codecs, most often coding an input speech signal in time-domain, are not suitable for generic audio signals, like music and reverberant speech. To overcome this drawback, switched codecs have been introduced, basically using a time-domain approach for coding speech-dominated input sound signals and a frequency-domain approach for coding generic audio signals. However, such switched solutions typically require longer processing delay, needed both for speech-music classification and for calculating a transform to frequency-domain.

To overcome the above drawback related to longer processing delay, a more unified time-domain and frequency-domain coding model has been proposed in U.S. Pat. No. 9,015,038 (See Reference [1] of which the full content is incorporated herein by reference). This unified time-domain and frequency-domain coding model is part of the EVS (Enhanced Voice Services) sound codec standardized by 3GPP ($3^{rd}$ Generation Partnership Project) as described in Reference [2], of which the full content is incorporated herein by reference. In recent years, 3GPP started working on developing a 3D (Three-Dimensional) sound codec for immersive services called IVAS (Immersive Voice and Audio Services), based on the EVS codec (See reference [3] of which the full content is incorporated herein by reference).

To make the coding model even more efficient for a specific kind of signal, a coding mode has been added to efficiently allocate the available bits between time-domain and frequency-domain and between low and high frequency. The additional coding mode is triggered by a new speech/music classifier of which the output allows for an unclear category for signals that cannot be clearly classified as music nor speech (See Reference [4] of which the full content is incorporated herein by reference).

SUMMARY

The present disclosure relates to a unified time-domain/frequency-domain coding method for coding an input sound signal. The method comprises: classifying the input sound signal into one of a plurality of sound signal categories, wherein the sound signal categories comprise an unclear signal type category showing that the nature of the input sound signal is unclear; selecting one of a plurality of coding sub-modes for coding the input sound signal if the input sound signal is classified in the unclear signal type category; and mixed time-domain/frequency-domain coding the input sound signal using the selected coding sub-mode.

The present disclosure also relates to a unified time-domain/frequency-domain coding method for coding an input sound signal, comprising: classifying the input sound signal into one of a plurality of sound signal categories, wherein the sound signal categories comprise an unclear signal type category showing that the nature of the input sound signal is unclear; and mixed time-domain/frequency-domain coding the input sound signal in response to classification of the input sound signal in the unclear signal type category. Mixed time-domain/frequency-domain coding the input sound signal comprises a frequency band selection and bit allocation for selecting frequency bands to quantize and for distributing a bit budget available to quantization between the selected frequency bands.

According to the present disclosure, there is further provided a unified time-domain/frequency-domain coding device for coding an input sound signal, comprising: a classifier of the input sound signal into one of a plurality of sound signal categories, wherein the sound signal categories comprise an unclear signal type category showing that the nature of the input sound signal is unclear; a selector of one of a plurality of coding sub-modes for coding the input sound signal if the input sound signal is classified in the unclear signal type category; and a mixed time-domain/frequency-domain encoder for coding the input sound signal using the selected coding sub-mode.

The present disclosure is still further concerned with a unified time-domain/frequency-domain coding device for coding an input sound signal, comprising: a classifier of the input sound signal into one of a plurality of sound signal categories, wherein the sound signal categories comprise an unclear signal type category showing that the nature of the input sound signal is unclear; and a mixed time-domain/frequency-domain encoder for coding the input sound signal in response to classification of the input sound signal in the unclear signal type category. The mixed time-domain/frequency-domain encoder comprises a selector of frequency bands and allocator of bits for selecting frequency bands to quantize and for distributing a bit budget available to quantization between the selected frequency bands.

The present disclosure provides a sound signal decoding method comprising: receiving a bitstream conveying information usable to reconstruct a mixed time-domain/frequency-domain excitation representative of a sound signal classified in an unclear signal type category showing that the nature of the sound signal is unclear, wherein the information includes one of a plurality of coding sub-modes used for coding the sound signal classified in the unclear signal type category; reconstructing the mixed time-domain/frequency-domain excitation in response to the information conveyed in the bitstream, including the coding sub-mode used for coding the input sound signal; converting the mixed time-domain/frequency-domain excitation to time-domain; and filtering the mixed time-domain/frequency-domain excitation converted to time-domain through a synthesis filter to produce a synthesized version of the sound signal.

The present disclosure proposes a sound signal decoding method comprising: receiving a bitstream conveying information usable to reconstruct a mixed time-domain/frequency-domain excitation representative of a sound signal (a) classified in an unclear signal type category showing that the nature of the sound signal is unclear and (b) coded using (i) frequency bands selected for quantization and (ii) a bit budget available to quantization distributed between the frequency bands; reconstructing the mixed time-domain/frequency-domain excitation in response to the information conveyed in the bitstream, wherein reconstructing the mixed time-domain/frequency-domain excitation comprises selecting the frequency bands used for quantization and the distribution of the bit budget available to quantization between the frequency bands; converting the mixed time-domain/frequency-domain excitation to time-domain; and filtering the mixed time-domain/frequency-domain excitation converted to time-domain through a synthesis filter to produce a synthesized version of the sound signal.

In accordance with the present disclosure, there is provided a sound signal decoder comprising: a receiver of a bitstream conveying information usable to reconstruct a mixed time-domain/frequency-domain excitation representative of a sound signal classified in an unclear signal type category showing that the nature of the sound signal is unclear, wherein the information includes one of a plurality of coding sub-modes used for coding the sound signal classified in the unclear signal type category; a re-constructor of the mixed time-domain/frequency-domain excitation in response to the information conveyed in the bitstream, including the coding sub-mode used for coding the input sound signal; a converter of the mixed time-domain/frequency-domain excitation to time-domain; and a synthesis filter for filtering the mixed time-domain/frequency-domain excitation converted to time-domain to produce a synthesized version of the sound signal.

The present disclosure is still further concerned with a sound signal decoder comprising: a receiver of a bitstream conveying information usable to reconstruct a mixed time-domain/frequency-domain excitation representative of a sound signal (a) classified in an unclear signal type category showing that the nature of the sound signal is unclear and (b) coded using (i) frequency bands selected for quantization and (ii) a bit budget available to quantization distributed between the frequency bands; a re-constructor of the mixed time-domain/frequency-domain excitation in response to the information conveyed in the bitstream, wherein the re-constructor selects the frequency bands used for quantization and the distribution of the bit budget available to quantization between the frequency bands; a converter of the mixed time-domain/frequency-domain excitation to time-domain; and a synthesis filter for filtering the mixed time-domain/frequency-domain excitation converted to time-domain to produce a synthesized version of the sound signal.

The foregoing and other features will become more apparent upon reading of the following non-restrictive description of illustrative embodiments of the unified time-domain/frequency-domain coding method, the unified time-domain/frequency-domain coding device, the decoding method and decoder device, given by way of example only with reference to the accompanying drawings.

DETAILED DESCRIPTION

Figure 1:
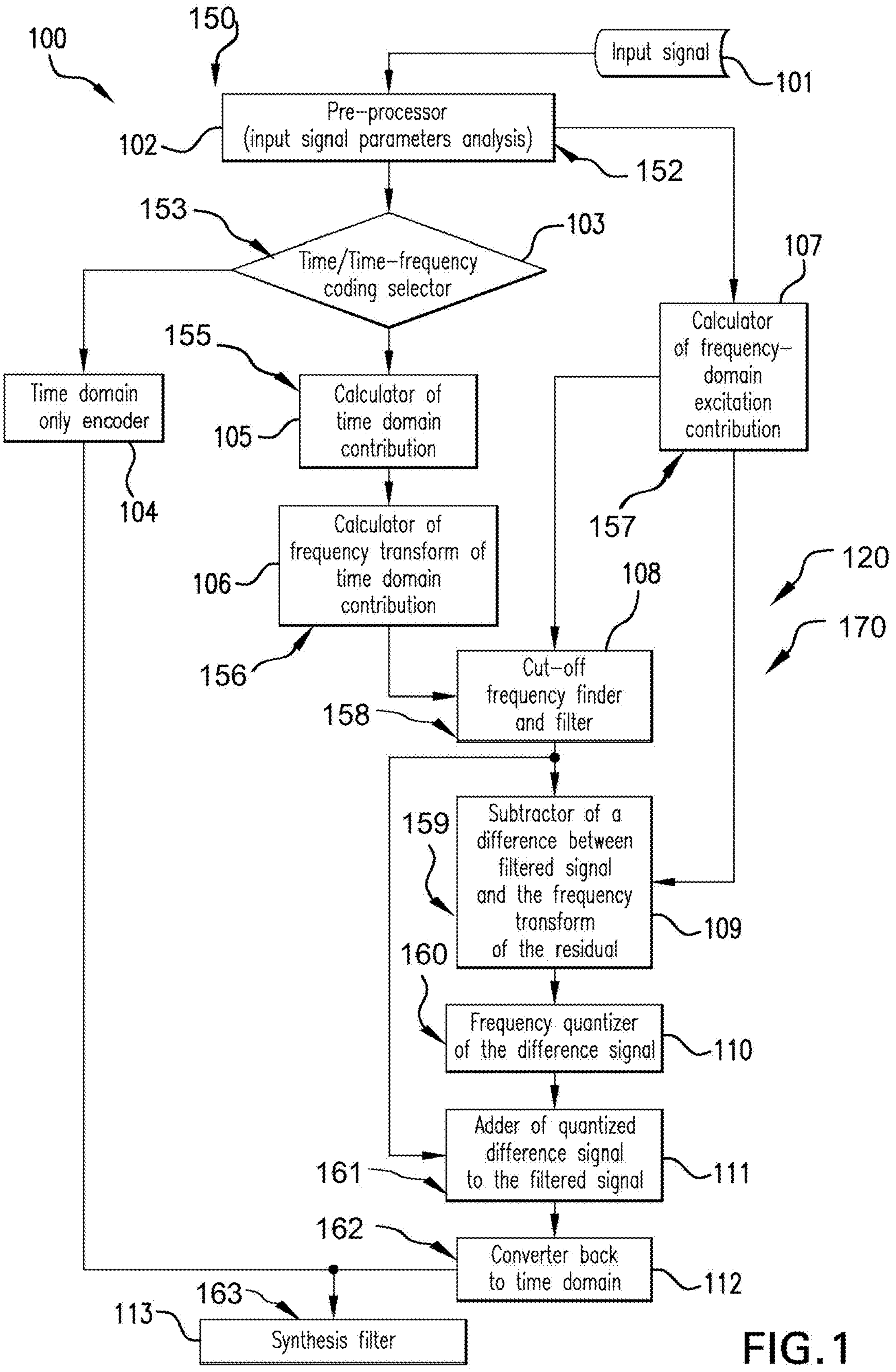
FIG. 1 PRIOR ART
FIG. 1 is a schematic block diagram illustrating concurrently an overview of a unified time-domain/frequency-domain CELP (Code-Excited Linear Prediction) coding method and of a corresponding unified time-domain/frequency-domain CELP coding device, for example ACELP (Algebraic Code-Excited Linear Prediction) coding method and device.

The present disclosure proposes a unified time-domain and frequency-domain coding model which improves synthesis quality for generic audio signals such as, for example, music and/or reverberant speech, without increasing the processing delay and the bitrate. This unified time-domain and frequency-domain coding model comprises:

A time-domain coding mode operating in Linear Prediction (LP) residual domain where the available bits are dynamically allocated among an adaptive codebook, one or more fixed codebooks (for example an algebraic codebook, a Gaussian codebook, etc.), a variable length fixed codebook; and a frequency-domain coding mode, depending upon the characteristics of the input sound signal.

To achieve a low processing delay and low bitrate conversational sound codec that improves the synthesis quality of generic audio signals such as, for example, music and/or reverberant speech, the frequency-domain coding mode is integrated as close as possible to a CELP (Code-Excited Linear Prediction) time-domain coding mode. For that purpose, the frequency-domain coding mode uses a frequency transform performed in the LP (Linear Prediction) residual domain. This allows switching nearly without artifact from one frame, for example a 20 ms frame, to another. As well known in the art of sound codecs, the input sound signal is sampled at a given sampling rate and processed by groups of these samples called "frames", usually divided into a number of "sub-frames". Here, the integration of the two (2) time-domain and frequency-domain coding modes is sufficiently close to allow dynamic reallocation of the bit budget to another coding mode if it is determined that the current coding mode is not sufficiently efficient.

One feature of the proposed unified time-domain and frequency-domain coding model is a variable time support of the time-domain component, which varies from a quarter frame (sub-frame) to a complete frame on a frame-by-frame basis. As a non-limitative illustrative example, a frame may represent 20 ms of input sound signal. Such a frame corresponds to 320 samples of the input sound signal if the inner sampling rate of the sound codec is 16 kHz or to 256 samples per frame if the inner sampling rate of the codec is 12.8 kHz. Then a sub-frame (quarter of a frame in the present example) represents 80 or 64 samples depending on the inner sampling rate of the sound codec. In the present non-restrictive illustrative embodiment, the inner sampling rate of the sound codec is 12.8 kHz giving a frame length of 256 samples and a sub-frame length of 64 samples of the input sound signal.

The variable time support makes it possible to capture major temporal events with a minimum bitrate to create a basic time-domain excitation contribution. At very low bitrate, the time support is usually the entire frame. In that case, the time-domain contribution of the excitation is composed only of the adaptive codebook; corresponding adaptive-codebook (pitch) information and gain are then transmitted once per frame. When more bitrate is available, it is possible to capture more temporal events by shortening the time support and increasing the bitrate allocated to the time-domain coding mode. Eventually, when the time support is sufficiently short (shorter than a quarter of a frame (sub-frame)), and the available bitrate is sufficiently high, the time-domain contribution of the excitation may include, for each sub-frame, the adaptive-codebook contribution with the corresponding adaptive-codebook gain, a fixed-codebook contribution with a corresponding fixed-codebook gain, or both the adaptive-codebook and fixed-codebook contributions with the corresponding gains. Alternatively, it is also possible to transport, for each half of a frame (sub-frame), an adaptive-codebook contribution with the corresponding adaptive-codebook gain and a fixed-codebook contribution with the corresponding fixed-codebook gain; this has the advantage of not consuming too much bitrate while still being able to code temporal events. Parameters describing codebook indices and gains are then transmitted for each sub-frame.

At low bitrate, conversational sound codecs are incapable of coding properly higher frequencies. This causes an important degradation of the synthesis quality when the input sound signal includes music and/or reverberant speech. To solve this issue, a feature is added to compute the efficiency of the time-domain excitation contribution. In some cases, whatever the input bitrate and the time frame support are, the time-domain excitation contribution is not valuable. In those cases, all the bits are reallocated to the next step of frequency-domain coding. But most of the time, the time-domain excitation contribution is valuable up only to a certain frequency (herein after the "cut-off frequency"). In these cases, the time-domain excitation contribution is filtered out above the cut-off frequency. The filtering operation permits to keep valuable information coded with the time-domain excitation contribution and remove the non-valuable information above the cut-off frequency. In a non-restrictive illustrative embodiment, the filtering is performed in frequency-domain by setting the frequency bins above a certain frequency (cut-off frequency) to zero.

The variable time support in combination with the variable cut-off frequency makes the bit allocation inside the unified time-domain and frequency-domain coding model very dynamic. The bitrate after the quantization of the LP filter can be allocated entirely to the time domain or entirely to the frequency domain or somewhere in between. The bitrate allocation between the time and frequency domains is conducted as a function of the number of sub-frames used for the time-domain excitation contribution, of the available bit budget, and of the cut-off frequency computed. To make the unified time-domain and frequency-domain coding model even more efficient for a specific kind of input sound signal, specific coding sub-modes are added to efficiently allocate the available bits between the time domain, the frequency domain and between low and high frequencies. These added specific coding sub-modes are determined using a new speech/music audio classifier producing an output allowing for an unclear signal category (signals that cannot be clearly classified as music nor speech).

To create a total excitation which will match more efficiently the input LP residual, the frequency-domain coding mode is applied. A feature is that frequency-domain coding is performed on a vector which contains a difference between a frequency representation (frequency transform) of the input LP residual and a frequency representation (frequency transform) of the filtered time-domain excitation contribution up to the cut-off frequency, and which contains a frequency representation (frequency transform) of the input LP residual itself above that cut-off frequency. A smooth spectrum transition is inserted between both segments just above the cut-off frequency. In other words, the high-frequency part of the frequency representation of the time-domain excitation contribution is first zeroed out above the cut-off frequency. A transition region between the unchanged part of the spectrum and the zeroed part of the spectrum of the time-domain excitation contribution is inserted just above the cut-off frequency to ensure a smooth transition between both parts of the spectrum. This modified spectrum of the time-domain excitation contribution is then subtracted from the frequency representation of the input LP residual. The resulting spectrum thus corresponds to the difference of both spectra below the cut-off frequency, and to the frequency representation of the LP residual above it, with some transition region. The cut-off frequency, as mentioned hereinabove, can vary from one frame to another.

Whatever the frequency quantization method (frequency-domain coding mode) chosen, there is always a possibility of pre-echo especially with long windows. In the herein disclosed technique, the used windows are square windows, so that the extra window length compared to the coded input sound signal is zero (0), i.e. no overlap-add is used. While this corresponds to the best window to reduce any potential pre-echo, some pre-echo may still be audible on temporal attacks. Many techniques exist to solve such pre-echo problem but the present disclosure proposes a simple feature for cancelling this pre-echo problem. This feature is based on a memory-less time-domain coding mode which is derived from the "Transition Mode" of ITU-T Recommendation G.718; Reference [5], sections 6.8.1.4 and 6.8.4.2 of which the full content is incorporated herein by reference. The idea behind this feature is to take advantage of the fact that the proposed unified time-domain and frequency-domain coding model is integrated to the LP residual domain, which allows for switching without artifact almost at any time. When an input sound signal is considered as generic audio (music and/or reverberant speech) and when a temporal attack is detected in a frame, then this frame only is encoded with the memory-less time-domain coding mode. This memory-less time-domain coding mode will take care of the temporal attack thus avoiding the pre-echo that could be introduced when using frequency-domain coding of that frame.

NON-RESTRICTIVE ILLUSTRATIVE EMBODIMENT

In the proposed unified time-domain and frequency-domain coding model, the above mentioned adaptive codebook, one or more fixed codebooks (for example an algebraic codebook, a Gaussian codebook, etc.), i.e. the so called time-domain codebooks, and the frequency-domain quantization (frequency-domain coding mode) can be seen as a codebook library, and the bits can be distributed among all the available codebooks, or a subset thereof. This means for example that if the input sound signal is a clean speech, all the bits will be allocated to the time-domain coding mode, basically reducing the coding to the legacy CELP scheme. On the other hand, for some music segments, all the bits allocated to encode the input LP residual are sometimes best spent in the frequency-domain, for example in transform-domain. Furthermore, specific cases can be added in which (a) the time-domain uses a larger part of the total available bitrate to code more time-domain events while still maintaining bits to code some of the frequency information or (b) low frequency content is prioritized over high frequency content and vice versa.

As indicated in the foregoing description, temporal support for the time-domain and frequency-domain coding modes does not need to be the same. While the bits spent on the different time-domain coding operations (adaptive and algebraic codebook searches) are usually distributed on a sub-frame basis (typically a quarter of a frame, or 5 ms of time support), the bits allocated to the frequency-domain coding mode are distributed on a frame basis (typically 20 ms of time support) to improve frequency resolution.

The bit budget allocated to the time-domain CELP coding mode can be also dynamically controlled depending on the input sound signal. In some cases, the bit budget allocated to the time-domain CELP coding mode can be zero, effectively meaning that the entire bit budget is attributed to the frequency-domain coding mode. The choice of working in the LP residual domain both for the time-domain and the frequency-domain coding modes has two (2) main benefits. First, this is compatible with the time-domain CELP coding mode, proved efficient in speech signals coding. Consequently, no artifact is introduced due to the switching between the two types of coding modes (time-domain and frequency-domain coding modes). Second, lower dynamics of the LP residual with respect to the original input sound signal, and its relative flatness, make easier the use of a square window for the frequency transforms thus permitting use of a non-overlapping window.

In a non limitative example where the inner sampling rate of the codec is 12.8 kHz (meaning 256 samples per frame), similarly as in the ITU-T recommendation G.718 (Reference [5]), the length of the sub-frames used in the time-domain CELP coding mode can vary from a typical ¼ of the frame length (5 ms) to a half frame (10 ms) or a complete frame length (20 ms). The sub-frame length decision is based on the available bitrate and on an analysis of the input sound signal, particularly the spectral dynamics of this input sound signal. The sub-frame length decision can be performed in a closed loop manner. To save on complexity, it is also possible to base the sub-frame length decision in an open loop manner. The sub-frame length decision can be also controlled by the nature of the input sound signal as detected by a signal classifier, for example a speech/music classifier. The sub-frame length can be changed from frame to frame.

Once the length of the sub-frames is chosen in a current frame, a standard closed-loop pitch analysis is performed and the first contribution to the excitation signal is selected from the adaptive codebook. Then, depending on the available bit budget and the characteristics of the input sound signal (for example in the case of an input speech signal), a second contribution from one or several fixed codebooks can be added before conversion in the transform domain. The resulting excitation contribution is the time-domain excitation contribution. On the other hand, at very low bitrates and in the case of a generic audio signal, it is often better to skip the fixed codebook stage and use all the remaining bits for the transform-domain coding. The transform-domain coding can be for example a frequency-domain coding mode. As described above, the sub-frame length can be one fourth of the frame, one half of the frame, or one frame long. The fixed-codebook contribution is used only if the sub-frame length is equal to ¼ of the frame length. In case the sub-frame length is decided to be half a frame or the entire frame long, then only the adaptive-codebook contribution is used to represent the time-domain excitation contribution, and all remaining bits are allocated to the frequency-domain coding mode. Alternatively, an additional coding mode will be described where the fixed codebook can be used when the sub-frame length is equal to half the frame length. This addition has been made to improve the quality of particular kinds of input sound signals containing a temporal event while keeping an acceptable bit budget to code the frequency-domain excitation contribution.

Once the computation of the time-domain excitation contribution is completed, its efficiency needs to be assessed and quantized. If the gain of the coding in time-domain is very low, it is more efficient to remove the time-domain excitation contribution altogether and to use all the bits for the frequency-domain coding mode. On the other hand, for example in the case of a clean input speech signal, the frequency-domain coding mode is not needed, and all the bits are allocated to the time-domain coding mode. But often the coding in time-domain is efficient only up to a certain frequency. This frequency corresponds to the above mentioned cut-off frequency of the time-domain excitation contribution. Determination of such cut-off frequency ensures that the entire time-domain coding is helping to get a better final synthesis rather than working against the frequency-domain coding.

The cut-off frequency can be estimated in the frequency domain. To compute the cut-off frequency, the spectrums of both the LP residual and the time-domain excitation contribution are first split into a predefined number of frequency bands in each of which a number of frequency bins are defined. The number of frequency bands and the number of frequency bins covered by each frequency band can vary from one implementation to another. For each of the frequency bands, a normalized correlation is computed between the frequency representation of the time-domain excitation contribution and the frequency representation of the LP residual, and the correlation is smoothed between adjacent frequency bands. As a non-limitative example, the per-band correlations are lower limited to 0.5 and normalized between 0 and 1, and an average correlation is then computed as the average of the correlations for all the frequency bands. For the purpose of a first estimation of the cut-off frequency, the average correlation is then scaled between 0 and half the internal sampling rate (half the internal sampling rate corresponding to the normalized correlation value of 1). At very low bitrate or for the additional coding sub-modes as described herein below, the average correlation is doubled before finding the cut-off frequency. This is done for cases where it is known that the time-domain excitation contribution would be needed even if the correlation is not very high because of the low bitrate being used, or because the type of input sound signal would not allow for a high correlation. The first estimation of the cut-off frequency is then found as the upper bound of the frequency band being closest to the value of the scaled average correlation. In an example of implementation, sixteen (16) frequency bands at a 12.8 kHz internal sampling rate are defined for correlation computation.

Taking advantage of the psychoacoustic property of the human ear, the reliability of the estimation of the cut-off frequency may be improved by comparing the estimated position of the $8^{th}$ harmonic frequency of the pitch to the cut-off frequency estimated by the correlation computation. If this position is higher than the cut-off frequency estimated by the correlation computation, the cut-off frequency is modified to correspond to the position of the $8^{th}$ harmonic frequency of the pitch. If one of the additional coding sub-modes is used, the cut-off frequency has a minimum value above or equal to, for example, 2775 Hz ($7^{th}$ band). The final value of the cut-off frequency is then quantized and transmitted to a distant decoder. In an example of implementation, 3 or 4 bits are used for such quantization, giving 8 or 16 possible cut-off frequencies depending on the bitrate.

Once the cut-off frequency is known, frequency quantization of the frequency-domain excitation contribution is performed. First the difference between the frequency representation (frequency transform) of the input LP residual and the frequency representation (frequency transform) of the time-domain excitation contribution is determined. Then a new vector is created, consisting of this difference up to the cut-off frequency, and a smooth transition to the frequency representation of the input LP residual for the remaining spectrum. A frequency quantization is then applied to the whole new vector. In an example of implementation, the quantization consists of coding the sign and the position of dominant (most energetic) spectral pulses. The number of pulses to be quantized per frequency band is related to the bitrate available for the frequency-domain coding mode. If the available bits are insufficient to cover all the frequency bands, the remaining bands are filled with noise only.

Frequency quantization of a frequency band using the quantization method described in the previous paragraph does not guarantee that all frequency bins within this band are quantized. This is especially true at low bitrates where the number of spectral pulses quantized per frequency band is relatively low. To prevent the apparition of audible artifacts due to these non-quantized bins, some noise is added to fill these gaps. As at low bitrates the quantized spectral pulses should dominate the spectrum rather than the inserted noise, the noise spectrum amplitude corresponds only to a fraction of the amplitude of the pulses. The amplitude of the added noise in the spectrum is higher when the bit budget available is low (allowing more noise) and lower when the bit budget available is high.

In the frequency-domain coding mode, gains are computed for each frequency band to match the energy of the non-quantized signal to the quantized signal. The gains are vector quantized and applied per band to the quantized signal. When, for example, the unified time-domain and frequency-domain coding model changes the bit allocation from a time-domain only coding mode to a mixed time-domain/frequency-domain coding mode, the per band excitation spectrum energy of the time-domain only coding mode does not match the per band excitation spectrum energy of the mixed time-domain/frequency-domain coding mode. This energy mismatch can create some switching artifacts especially at low bitrate. To reduce any audible degradation created by this bit reallocation, a long-term gain can be computed for each band and can be applied to correct the energy of each frequency band for a few frames after the switching from the time-domain only coding mode to the mixed time-domain/frequency-domain coding mode.

After the completion of the frequency-domain coding mode, the total excitation is found by adding the frequency-domain excitation contribution to the frequency representation (frequency transform) of the time-domain excitation contribution and then the sum of these two (2) excitation contributions is transformed back to time-domain to form a total excitation. Finally, the synthesized signal is computed by filtering the total excitation through a LP synthesis filter.

In one embodiment, while the CELP coding memories are updated on a sub-frame basis using only the time-domain excitation contribution, the total excitation is used to update those memories at frame boundaries.

In another possible implementation, the CELP coding memories are updated on a sub-frame basis and also at the frame boundaries using only the time-domain excitation contribution. This results in an embedded structure where the frequency-domain coded signal constitutes an upper quantization layer independent from the core CELP layer. In this particular case, the fixed codebook is always used in order to update the adaptive codebook content. However, the frequency-domain coding mode can apply to the whole frame. This embedded approach works for bit rates around 12 kbps and higher.

1) SOUND SIGNAL TYPE CLASSIFICATION

FIG. 1 is a schematic block diagram illustrating concurrently an overview of a unified time-domain/frequency-domain CELP coding method 150 and a corresponding unified time-domain/frequency-domain CELP coding device 100, for example ACELP method and device. Of course, other types of CELP coding method and device can be implemented using the same concept.

Figure 2:
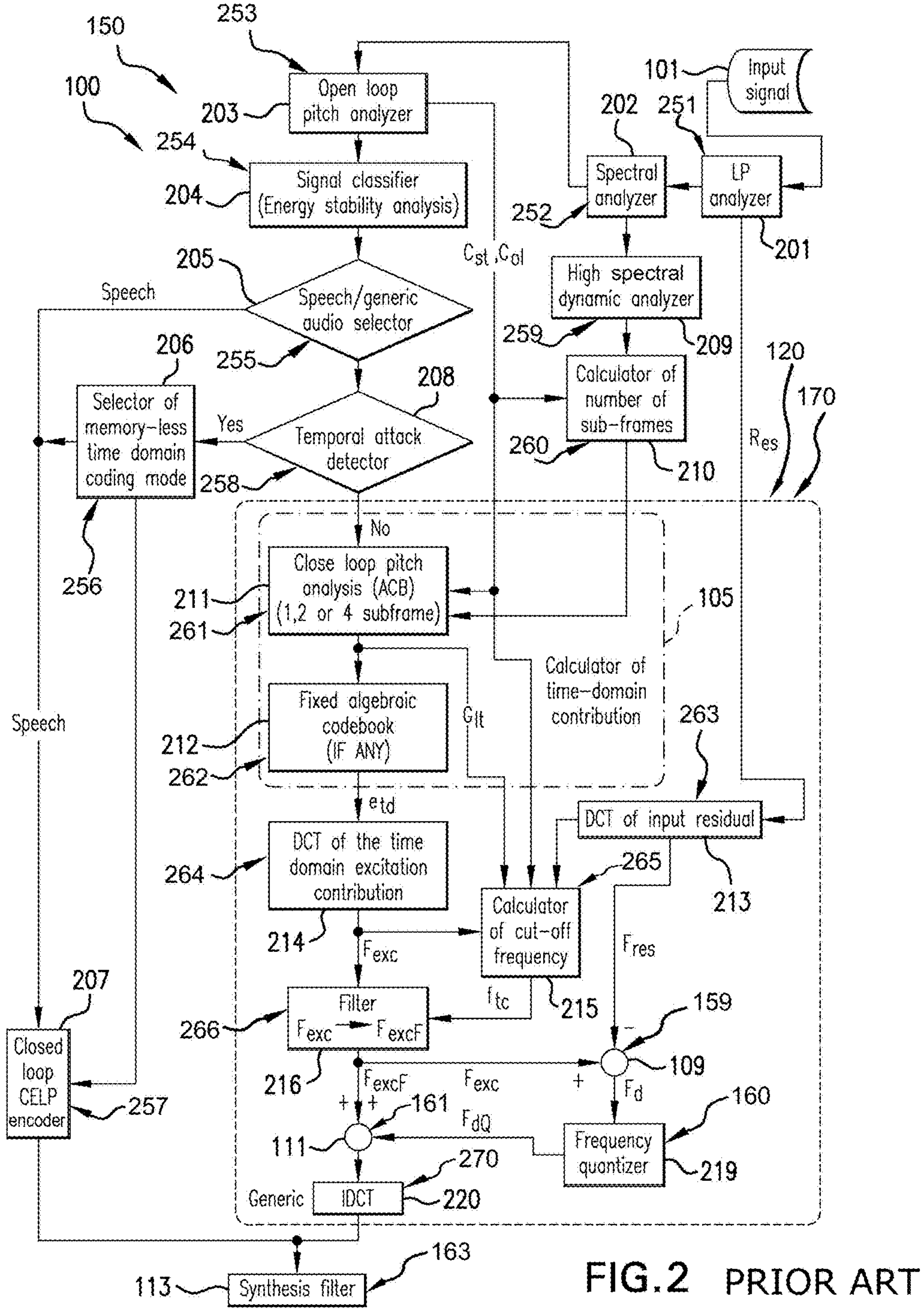
FIG. 2 PRIOR ART
FIG. 2 is a schematic block diagram of a more detailed structure of the unified time-domain/frequency-domain coding method and device of FIG. 1, in which a pre-processor conducts a first level of analysis to classify the input sound signal.

FIG. 2 is a schematic block diagram of a more detailed structure of the unified time-domain/frequency-domain CELP coding method 150 and device 100 of FIG. 1.

The unified time-domain/frequency-domain CELP coding device 100 comprises a pre-processor 102 (FIG. 1) for performing an operation 152 of analyzing parameters of the input sound signal 101 (FIGS. 1 and 2). Referring to FIG. 2, the pre-processor 102 comprises an LP analyzer 201 for performing an operation 251 of LP analysis of the input sound signal 101, a spectral analyzer 202 for performing an operation 252 of spectral analysis, an open loop pitch analyzer 203 for performing an operation 253 of open loop pitch analysis, and a signal classifier 204 for performing an operation 254 of classification of the input sound signal. The analyzers 201 and 202 and the associated operations 251 and 252 perform the LP and spectral analyses usually carried out in CELP coding, as described for example in ITU-T recommendation G.718, Reference [5], sections 6.4 and 6.1.4, and, therefore, will not be further described in the present disclosure.

The pre-processor 102 conducts a first level of analysis to classify the input sound signal 101 between speech and non-speech (generic audio (music or reverberant speech)), for example in a manner similar to that described in Reference [6], of which the full content is incorporated herein by reference, or with any other reliable speech/non-speech discrimination methods.

After this first level of analysis, the pre-processor 102 performs a second level of analysis of input signal parameters to allow the use of time-domain CELP coding (no frequency-domain coding) on some sound signals with strong non-speech characteristics, but that are still better encoded with a time-domain approach. When an important variation of energy occurs, this second level of analysis allows the unified time-domain/frequency-domain CELP coding device 100 to switch into a memory-less time-domain coding mode, generally called Transition Mode in Reference [7], of which the full content is incorporated herein by reference.

During this second level of analysis, the signal classifier 204 calculates and uses a variation $\sigma_C$ of a smoothed version $C_{st}$ of an open-loop pitch correlation from the open-loop pitch analyzer 203, a current total frame energy $E_{tot}$ (total energy of the input sound signal in the current frame) and a difference between the current total frame energy and the previous total frame energy $E_{diff}$. First, the signal classifier 204 computes the variation of the smoothed open loop pitch correlation using, for example, the following relation:

$$\sigma_C = \sqrt{\sum_{i=0}^{i=-10}\left(\frac{\left(C_{st}(i)-\overline{C_{st}}\right)^2}{10}\right)}$$

where:

$C_{st}$ is the smoothed open-loop pitch correlation defined as: $C_{st}=0.9\cdot C_{ol}+0.1\cdot C_{st}$;

$C_{ol}$ is the open-loop pitch correlation calculated by the analyzer 203 using a method known to those of ordinary skill in the art of CELP coding, for example, as described in ITU-T recommendation G.718, Reference [5], Section 6.6;

$\overline{C_{st}}$ is an average over the last 10 frames i of the smoothed open-loop pitch correlation $C_{st}$;

$\sigma_C$ is the variation of the smoothed open loop pitch correlation.

When, during the first level of analysis, the signal classifier 204 classifies a frame as non-speech, the following verifications are performed by the signal classifier 204 to determine, in the second level of analysis, if it is really safe to use a mixed time-domain/frequency-domain coding mode. Sometimes, it is however better to encode the current frame with the time-domain coding mode only, using one of the time-domain approaches estimated by the pre-processing function of the time-domain coding mode. In particular, it might be better to use the memory-less time-domain coding mode to reduce at a minimum any possible pre-echo that can be introduced with a mixed time-domain/frequency-domain coding mode.

As a non-limitative implementation of a first verification whether the mixed time-domain/frequency-domain coding mode should be used, the signal classifier 204 calculates a difference between the current total frame energy and the previous frame total energy. When the difference $E_{diff}$ between the current total frame energy $E_{tot}$ and the previous frame total energy is higher than, for example, 6 dB, this corresponds to a so-called "temporal attack" in the input sound signal 101. In such a situation, the speech/non-speech decision and the selected coding mode are overwritten and a memory-less time-domain coding mode is forced. More specifically, the unified time-domain/frequency-domain CELP coding device 100 comprises a time/time-frequency coding selector 103 (FIG. 1) for performing an operation 153 of selection between time-domain only coding and mixed time-domain/frequency-domain coding. For that purpose, the time/time-frequency coding selector 103 comprises a speech/generic audio selector 205 (FIG. 2) for performing an operation 255 of selecting between speech and generic audio for the classification of the input sound signal 101, a temporal attack detector 208 (FIG. 2) for performing an operation 258 of detecting a temporal attack in the input sound signal 101, and a selector 206 (FIG. 2) for performing an operation 256 of selecting the memory-less time-domain coding mode. In other words:

In response to a determination of speech signal by the selector 205, a closed-loop CELP encoder 207 (FIG. 2) is used to perform an operation 257 of CELP coding the speech signal.

In response to both a determination of non-speech signal (generic audio) by the selector 205 and a detection of a temporal attack in the input sound signal 101 by the detector 208, the selector 206 forces the closed-loop CELP encoder 207 (FIG. 2) to use the memory-less time-domain coding mode to code the input sound signal.

The closed-loop CELP encoder 207 forms part of the time-domain-only encoder 104 of FIG. 1. A closed-loop CELP encoder is well known to those of ordinary skill in the art and will not be further described in the present description.

As a non-limitative implementation of second verification whether the mixed time-domain/frequency-domain coding mode should be used, when the difference $E_{diff}$ between the current total frame energy $E_{tot}$ and the previous frame total energy is below or equal to 6 dB, but:

the smoothed open loop pitch correlation $C_{st}$ is higher than 0.96; or the smoothed open loop pitch correlation $C_{st}$ is higher than 0.85 and the difference $E_{diff}$ between the current total frame energy $E_{tot}$ and the previous frame total energy is below 0.3 dB; or the variation of the smoothed open loop pitch correlation $\sigma_C$ is below 0.1 and the difference $E_{diff}$ between the current total frame energy $E_{tot}$ and the last previous frame total energy is below 0.6 dB; or the current total frame energy $E_{tot}$ is below 20 dB;

and this is at least the second consecutive frame (cnt≥2) where the decision of the first level of the analysis is changed, then the speech/generic audio selector 205 determines that the current frame will be coded using a time-domain only coding mode using the closed-loop CELP encoder 207 (FIG. 2).

Otherwise, the time/time-frequency coding selector 103 selects the mixed time-domain/frequency-domain coding mode as disclosed in the following description.

The second verification can be summarized, for example when the non-speech input sound signal is music, using the following pseudo code:

```
if (generic audio)
  if (E_diff > 6dB)
    coding mode = Time domain memory less
    cnt = 1
  else if (C_st > 0.96 | (C_st > 0.85 & E_diff <
  0.3dB)|(σ_C < 0.1 & E_diff < 0.6dB)|E_tot < 20dB)
    cnt + +
    if (cnt >= 2)
      coding mode = Time domain
  else
    coding mode = mix time/frequency domain
    cnt = 0
```

where $E_{tot}$ is the current total frame energy expressed as:

$$E_{tot} = 10\log\left(\frac{\sum_{i=0}^{i=N} x(i)^2}{N}\right)$$

where x(i) represents the samples of the input sound signal in the current frame, N is the number of samples of the input sound signal by frame, and $E_{diff}$ is the difference between the current total frame energy $E_{tot}$ and the last previous frame total energy.

Figure 7:
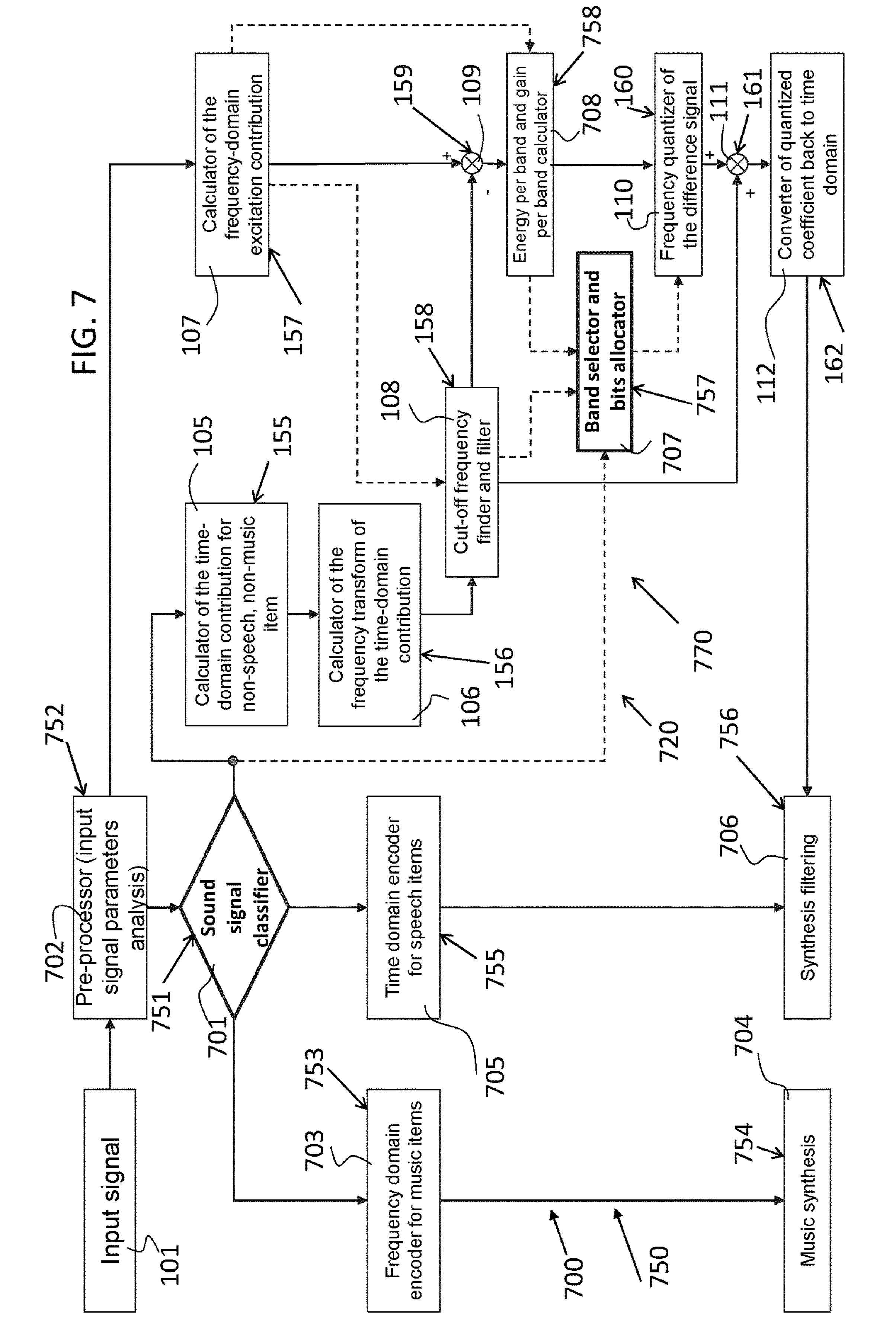
FIG. 7 is a schematic block diagram illustrating concurrently an alternative implementation of the unified time-domain/frequency-domain CELP coding method and corresponding unified time-domain/frequency-domain CELP coding device.

FIG. 7 is a schematic block diagram illustrating concurrently an alternative implementation of the unified time-domain/frequency-domain CELP coding method 750 and corresponding unified time-domain/frequency-domain CELP coding device 700, in which the pre-processor 702 also performs a first level of analysis to classify the input sound signal 101.

Specifically, the unified time-domain/frequency-domain CELP coding method 750 comprises an operation 752 of pre-processing the input sound signal 101 as described in Reference [4] to obtain the parameters required to classify this input sound signal. To perform operation 752, the mixed time-domain/frequency-domain CELP coding device 700 comprises the pre-processor 702.

The unified time-domain/frequency-domain CELP coding method 750 comprises an operation 751 of classifying the input sound signal 101 into speech, music and unclear signal type categories using the parameters from pre-processor 702 in a manner similar to that also described in Reference [4], or using any other reliable speech/music and unclear signal type discrimination methods. The unclear signal type category shows that the nature of the input sound signal 101 is unclear and, in particular, that the input sound signal 101 is not classified as speech nor music. To perform operation 751, the unified time-domain/frequency-domain CELP coding device 700 comprises a sound signal classifier 701.

If the sound signal classifier 701 classifies the input sound signal 101 into the music category, a frequency-domain encoder 703 performs an operation 753 of coding the input sound signal 101 using frequency-domain coding as described, for example, in Reference [2]. The frequency-domain encoded music signal can then be synthesized in a music synthesis operation 754 performed by a synthesizer 704 to recover the music signal.

In the same manner, if the sound signal classifier 701 classifies the input sound signal 101 into the speech category, a time-domain encoder 705 performs an operation 755 of coding the input sound signal 101 using time-domain coding as described, for example, in Reference [2]. The time-domain encoded speech signal can then be synthesized in a synthesis filtering operation 756 performed by a synthesizer 706 including a synthesis filter to recover the speech signal.

Accordingly, the unified time-domain/frequency-domain coding device 700 and method 750 maximise the performances of time-domain coding only and frequency-domain coding only by respectively limiting their usage to input sound signals having clear speech characteristics and input sound signals having clear music characteristics. This increases the overall quality of all types of input sound signals at low to medium bitrates.

Coding sub-modes have been designed as part of the unified time-domain and frequency-domain coding model to efficiently code input sound signals that are not classified as speech nor music (unclear signal type category). Two (2) bits are used to signal three (3) coding sub-modes identified by corresponding sub-mode flags. A fourth sub-mode allows for a backward interoperability to the legacy unified time-domain and frequency-domain coding model (EVS).

Figure 8:
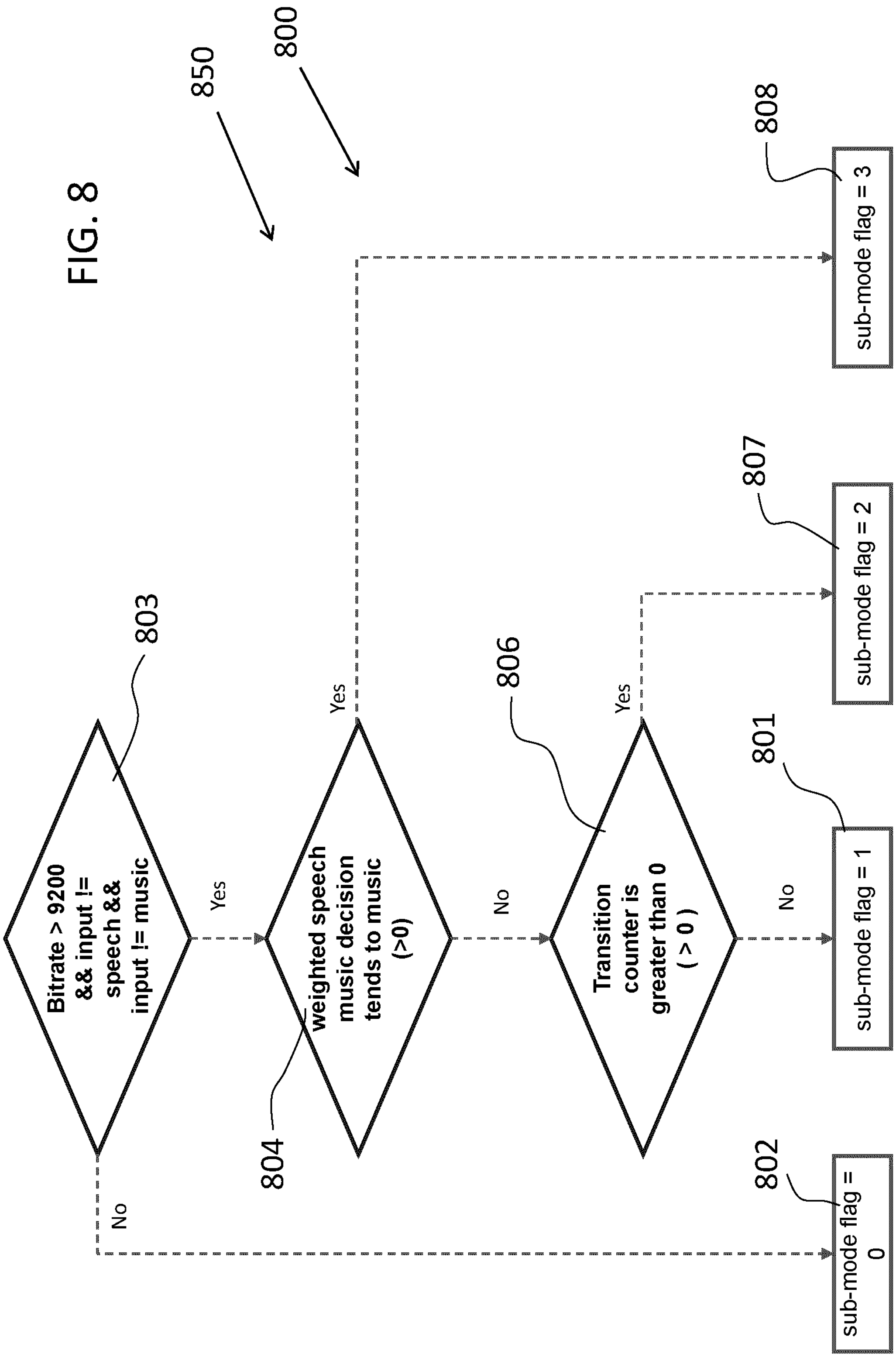
FIG. 8 is a schematic block diagram illustrating concurrently an operation of selecting coding sub-modes and a corresponding sub-mode selector.

As illustrated in FIG. 8, the operation 751 of classifying the input sound signal 101 comprises an operation 850 of selecting one of the coding sub-modes in response to the bitrate available for coding the input sound signal 101 and characteristics of this input sound signal classified in the unclear signal type category. To perform operation 850, the sound signal classifier 701 incorporates a sub-mode selector 800.

The coding sub-modes are identified by a sub-mode flag $F_{tfsm}$. In the non-limitative implementation of FIG. 8, the sub-mode selector 800 selects the coding sub-modes as follows:

- The sub-mode selector 800 selects the above mentioned backward coding sub-mode if (a) the bitrate available for coding the input sound signal 101 is not higher than 9.2 kbps and (b) the input sound signal 101 is not classified as speech nor music (see 803). The sub-mode flag $F_{tfsm}$ is then set to "0" (see 802). Selection of the backward coding mode causes the use of the legacy unified time-domain and frequency-domain coding model of FIGS. 1 and 2 (EVS).
- The sub-mode selector 800 selects a first coding sub-mode if (a) the input sound signal 101 is not classified as speech nor music by the classifier 701 and the available bitrate is high enough to allow for the coding of adaptive and fixed codebooks and gains, usually meaning a bitrate above 9.2 kbps (see 803), (b) a probability of the input sound signal 101 of being music (weighted speech/music decision tending to music, wdlp(n)) is not greater than "0" (see 804), and (c) no likelihood of temporal attack is detected in the current frame of the input sound signal (transition counter is not greater than "0" as described in ITU-T Recommendation G.718, Reference [5], section 6.8.1.4 and section 6.8.4.2) (see 806). The sub-mode flag $F_{tfsm}$ is then set to "1" (see 801). Although the input sound signal 101 is not classified as speech nor music by the classifier 701, the selector 800 detects "speech" like characteristics in the input sound signal 101 and selects the first coding sub-mode (sub-mode flag $F_{tfsm}$=1) since CELP is not optimal for coding such sound signal.

The sub-mode selector 800 selects a second coding sub-mode if (a) the input sound signal 101 is not classified as speech nor music by the classifier 701 and the available bitrate is high enough to allow for the coding of adaptive and fixed codebooks and gains, usually meaning a bitrate above 9.2 kbps (see 803), (b) a probability of the input sound signal 101 of being music (weighted speech/music decision tending to music, wdlp(n)) is not greater than "0" (see 804), and (c) likelihood of a temporal attack is detected in the current frame of the input sound signal (transition counter is greater than "0" as described in ITU-T Recommendation G.718, Reference [5], section 6.8.1.4 and section 6.8.4.2) (see 806). The sub-mode flag $F_{tfsm}$ is then set to "2" (see 807). As will be explained in the following description, the second coding sub-mode (sub-mode flag $F_{tfsm}$=2) allocates more bits to the lower part of the spectrum.

The sub-mode selector 800 selects a third coding sub-mode if (a) the input sound signal 101 is not classified as speech nor music by the classifier 701 and the available bitrate is high enough to allow for the coding of at least the adaptive codebook and gains and still have a significant amount of bits for frequency coding, usually meaning a bitrate above 9.2 kbps (see 803), and (b) a probability of the input sound signal 101 of being music (weighted speech/music decision tending to music, wdlp(n)) is greater than "0") (see 804). The sub-mode flag $F_{tfsm}$ is then set to "3" (see 808). Although the input sound signal 101 is not classified as speech nor music by the classifier 701, the selector 800 detects "music" like characteristics in the input sound signal 101 and selects the third coding sub-mode (sub-mode flag $F_{tfsm}$=3). Such a sound signal segment is still considered as non-music but the sub-mode flag $F_{tfsm}$ is set to "3" (selection of third coding sub-mode) indicating that the samples include high frequency or tonal content.

The probability of the input sound signal 101 of being speech or music or in between is described in Reference [4]. When the decision of speech or music classification is unclear, if the probability wdlp(n) is greater than 0, it is considered that the signal has some music characteristic. The table below shows the threshold where the probability would be high enough to be considered as music or speech.

TABLE 1

Probability thresholds for unclear category

| | | TO | | |
|---|---|---|---|---|
| | | SPEECH | UNCLEAR | MUSIC |
| FROM | UNCLEAR | <−2.5 | | >2.5 |

The selected coding sub-mode, for example the sub-mode flag $F_{tfsm}$, is transmitted into the bitstream to a distant decoder. The path chosen inside the decoder depends of signaling bits included in the bitstream. Once the decoder detects the presence of a frame coded using mixed time-domain/frequency-domain coding, the sub-mode flag $F_{tfsm}$ is decoded from the bitstream. If the detected sub-mode flag $F_{tfsm}$ is "0", then the EVS backward interoperable legacy unified time-domain and frequency-domain coding model will be used to decode the remaining part of the bitstream. On the other hand, if the sub-mode flag $F_{tfsm}$ is different from "0", sub-mode decoding is followed. The decoder will replicate the procedure followed by the encoder, in particular the bit distribution between time-domain and frequency-domain and the bit allocation in the different frequency bands as described later in section 6.2.

2) DECISION ON SUB-FRAME LENGTH

In typical CELP, input sound signal samples are processed in frames of 10-30 ms and these frames are divided into sub-frames for adaptive codebook and fixed codebook analysis. For example, a frame of 20 ms (256 samples when the internal sampling rate is 12.8 kHz) can be used and divided into 4 sub-frames of 5 ms. A variable sub-frame length is a feature used to integrate time-domain and frequency-domain into one coding mode. The sub-frame length can vary from a typical ¼ of the frame length to half of the frame length or a complete frame length. Of course, the use of another number of sub-frames (sub-frame length) can possibly be implemented.

The parameter analysis operation 152 of the unified time-domain/frequency-domain CELP coding method 150 comprises, as illustrated in FIG. 2, an operation 259 of determining a high spectral dynamic of the input sound signal 101, and an operation 260 of calculating a number of sub-frames by frame. To perform operations 259 and 260, the pre-processor 102 of the unified time-domain/frequency-domain CELP coding device 100 respectively comprises a high spectral dynamic analyzer 209 and a calculator 210 of the number of sub-frames.

The decision as to the length of the sub-frames (the number of sub-frames), or the time support, is determined by the calculator 210 based on the available bitrate and on the input sound signal analysis, in particular the high spectral dynamic of the input sound signal 101 from the analyzer 209 and the open-loop pitch analysis including the smoothed open loop pitch correlation $C_{st}$ from analyzer 203. The high spectral dynamic analyzer 209 is responsive to the information from the spectral analyzer 202 to determine high spectral dynamic of the input sound signal 101. The high spectral dynamic is computed, for example as described in ITU-T recommendation G.718, Reference [5], section 6.7.2.2, as an input spectrum without noise floor giving a representation of the input spectrum dynamic. When the average spectral dynamic of the input sound signal 101 in the frequency band between 4.4 kHz and 6.4 kHz as determined by the analyzer 209 is below, for example, 9.6 dB and the last frame was considered as having a high spectral dynamic, the input sound signal 101 is no longer considered as having high spectral dynamic. In that case, more bits can be allocated to the frequencies below, for example, 4 kHz, by adding more sub-frames to the time-domain coding mode or by forcing more pulses in the lower frequency part of the frequency-domain coding mode.

On the other hand, if an increase of the average spectral dynamic of the input sound signal 101 against the average spectral dynamic of the last frame that was not considered as having a high spectral dynamic as determined by the analyser 209 is greater than, for example, 4.5 dB, the input sound signal 101 is considered as having high spectral dynamic content above, for example, 4 kHz. In that case, depending on the available bitrate, some additional bits are used for coding the high frequencies of the input sound signal 101 to allow one or more frequency pulses coding.

The sub-frame length as determined by the calculator 210 (FIG. 2) is also dependent on the bit budget available for coding the input sound signal 101. At very low bitrate, e.g. bit rates below 9 kbps, only one sub-frame is available for time-domain coding otherwise the number of available bits will be insufficient for the frequency-domain coding. At medium bitrates, e.g. bit rates between 9 kbps and 16 kbps, one sub-frame is used for the case where the high frequencies contain high spectral dynamic content and two sub-frames if not. For medium-high bitrates, e.g. bit rates around 16 kbps and higher, the four (4) sub-frames case becomes also available if the above defined smoothed open loop pitch correlation $C_{st}$ is higher than, for example, 0.8.

While the case with one or two sub-frames limits the time-domain coding to an adaptive codebook contribution only (with coded pitch lag and pitch gain), i.e. no fixed codebook is used in that case, the case with four (4) sub-frames allow for adaptive and fixed codebook contributions if the available bit budget is sufficient. The four (4) sub-frame case is allowed at bitrates starting from around 16 kbps up. Because of bit budget limitations, the time-domain excitation contribution consists only of the adaptive codebook contribution at lower bitrates. A fixed-codebook contribution can be added at higher bit rates, for example starting at 24 kbps. For all cases the time-domain coding efficiency will be evaluated afterward to decide up to which frequency (the above mentioned cut-off frequency) such time-domain coding is valuable.

The alternative implementation of FIGS. 7 and 8 uses the above defined first, second or third coding sub-modes when the input sound 101 is classified by the classifier 701 into the unclear signal type category and the sub-mode flag $F_{tfsm}$ is greater than zero "0".

The sound signal classifier 701 determines that the number of sub-frames is four (4) unless the sub-mode flag $F_{tfsm}$ is set to "1" or "2" (selection of the first or second coding sub-mode), meaning that the content of the input sound signal 101 is closer to speech ("speech" like characteristics or likelihood of a temporal attack is/are detected in the input sound signal 101) and the available bitrate is below 15 kbps. Specifically:

- In the first or second coding sub-modes (sub-mode flag $F_{tfsm}$ set to "1" or "2"), the sound signal classifier 701 determines a number of four (4) sub-frames unless the available bitrate for coding the input sound signal 101 is below 15 kbps; then a coding mode using two (2) sub-frames will be selected. In both cases, a corresponding number of fixed codebooks is used, i.e. a number of two (2) or four (4) fixed codebooks; and
- In the third coding mode (sub-mode flag $F_{tfsm}$ set to 3, meaning that the content of the input sound signal 101 is closer to music ("music" like characteristics are detected in the input sound signal 101), the sound signal classifier 701 determines that the number of sub-frames is four (4) but no fixed codebook contribution is used to keep more bits available to the frequency-domain excitation contribution, unless the available bitrate for coding the input sound signal 101 is greater or equal to 22.6 kbps.

3) CLOSED LOOP PITCH ANALYSIS

In the unified time-domain/frequency-domain CELP coding device 100 and method 150 (FIG. 1), a mixed time-domain/frequency-domain coding method 170 and a corresponding mixed time-domain/frequency domain encoder 120 are used when generic audio is selected by selector 205 as the classification of the input sound signal 101 and no temporal attack is detected in detector 208. Alternatively, in the unified time-domain/frequency-domain CELP coding device 700 and method 750 (FIG. 7), a mixed time-domain/frequency-domain coding method 770 and a corresponding mixed time-domain/frequency domain encoder 720 are used when the sound signal classifier 701 classifies the input sound signal 101 in the "unclear signal type" category and one of the above defined first, second and third coding sub-modes is selected (sub-mode flag $F_{tfsm}$ set to "1", "2" or "3").

When the mixed time-domain/frequency-domain coding mode is used, a closed-loop pitch analysis followed, if needed, by a fixed algebraic codebook search are performed. For that purpose, the mixed time-domain/frequency domain coding method 170/770 comprises an operation 155 of calculating the time-domain excitation contribution. To perform operation 155, the mixed time-domain/frequency domain encoder 120/720 comprises a calculator of time-domain excitation contribution 105. The calculator 105 itself comprises an analyzer 211 (FIG. 2) responsive to the open-loop pitch analysis conducted in the open-loop pitch analyzer 203 (or pre-processor 702) and the sub-frame length (or the number of sub-frames in a frame) determined in calculator 210 or sound signal classifier 701 to perform an operation 261 of closed-loop pitch analysis. The closed-loop pitch analysis is well known to those of ordinary skill in the art and an example of implementation is described for example in ITU-T G.718 recommendation, Reference [5]; Section 6.8.4.1.4.1. The closed-loop pitch analysis results in computing the pitch parameters, also known as adaptive-codebook parameters, which mainly consist of a pitch lag (adaptive-codebook index T) and pitch gain (adaptive-codebook gain b). The adaptive-codebook contribution is usually the past excitation at delay T or an interpolated version thereof. The adaptive-codebook index T is encoded and transmitted to a distant decoder. The pitch gain b is also quantized and transmitted to the distant decoder.

When the closed-loop pitch analysis has been completed in operation 261 and a fixed-codebook contribution is used, the calculator of time-domain excitation contribution 105 comprises a fixed algebraic codebook 212 searched during an operation 262 of fixed codebook search to find the best fixed-codebook parameters usually comprising a fixed-codebook index and a fixed-codebook gain. The fixed-codebook index and gain form the fixed-codebook contribution. The fixed-codebook index is encoded and transmitted to the distant decoder. The fixed-codebook gain is also quantized and transmitted to the distant decoder. The fixed-algebraic codebook and searching thereof are believed to be well known to those of ordinary skill in the art of CELP coding and, therefore, will not be further described in the present disclosure.

The adaptive-codebook index and gain and, if used, the fixed-codebook index and gain form the time-domain CELP excitation contribution.

4) FREQUENCY TRANSFORM

During the frequency-domain coding of the mixed time-domain/frequency-domain coding mode, two signals are represented in transform-domain, for example in frequency-domain. In one embodiment, the time-to-frequency transform can be achieved using a 256 points type II (or type IV)

DCT (Discrete Cosine Transform) giving a resolution of 25 Hz with an inner sampling rate of 12.8 kHz but any other suitable transform could be used. In the case another transform is used, the frequency resolution (defined above), the number of frequency bands and the number of frequency bins per band (defined further below) might need to be revised accordingly.

As indicated in the foregoing description, in the unified time-domain/frequency-domain CELP coding device 100 and method 150 (FIGS. 1 and 2), the mixed time-domain/frequency-domain coding mode is used when generic audio is selected by selector 205 as the classification of the input sound signal 101 and no temporal attack is detected in detector 208. Alternatively, in the unified time-domain/frequency-domain CELP coding device 700 and method 750 (FIG. 7), the mixed time-domain/frequency-domain coding mode is used when the sound signal classifier 701 classifies the input sound signal 101 in the "unclear signal type" category. The mixed time-domain/frequency domain encoder 120/720 comprises a calculator 107 (FIGS. 1 and 7) of frequency-domain excitation contribution performing an operation 157 of calculating the frequency-domain excitation contribution in response to the input LP residual $r_{es}$(n) (Reference [5]) resulting from the operation 251 of LP analysis of the input sound signal 101 performed by the analyzer 201 (and pre-processor 702). As illustrated in FIG. 2, the calculator 107 may calculate a DCT 213, for example a type II DCT of the input LP residual $r_{es}$(n). The mixed time-domain/frequency domain encoder 120/720 also comprises a calculator 106 (FIGS. 1 and 7) for performing an operation 156 of calculating a frequency transform of the time-domain excitation contribution. As illustrated in FIG. 2, the calculator 106 may calculate a DCT 214, for example a type II DCT of the time-domain excitation contribution. The frequency transforms of the input LP residual $f_{res}$ and the time-domain CELP excitation contribution $f_{exc}$ can be calculated using, for example, the following expressions:

$$f_{res}(k)\begin{cases}\sqrt{\frac{1}{N}}\cdot\sum_{n=0}^{N-1} r_{es}(n)\cdot\cos\left(\frac{\pi}{N}\left(n+\frac{1}{2}\right)k\right), & k=0\\ \sqrt{\frac{2}{N}}\cdot\sum_{n=0}^{N-1} r_{es}(n)\cdot\cos\left(\frac{\pi}{N}\left(n+\frac{1}{2}\right)k\right), & 1\le k<N-1\end{cases}$$

and:

$$f_{exc}(k)\begin{cases}\sqrt{\frac{1}{N}}\cdot\sum_{n=0}^{N-1} e_{td}(n)\cdot\cos\left(\frac{\pi}{N}\left(n+\frac{1}{2}\right)k\right), & k=0\\ \sqrt{\frac{2}{N}}\cdot\sum_{n=0}^{N-1} e_{td}(n)\cdot\cos\left(\frac{\pi}{N}\left(n+\frac{1}{2}\right)k\right), & 1\le k<N-1\end{cases}$$

where $r_{es}$(n) is the input LP residual, $e_{td}$(n) is the time-domain excitation contribution, and N is the frame length. In a possible implementation, the frame length is 256 samples for a corresponding inner sampling rate of 12.8 kHz. The time-domain excitation contribution is given by the following relation:

$$e_{td}(n)=bv(n)+gc(n)$$

where v(n) is the adaptive-codebook contribution, b is the adaptive-codebook gain, c(n) is the fixed-codebook contribution, and g is the fixed-codebook gain. It should be noted that the time-domain excitation contribution may consist only of the adaptive codebook contribution as described in the foregoing description.

5) CUT-OFF FREQUENCY OF TIME-DOMAIN CONTRIBUTION

With sound signal samples classified as generic audio (FIG. 1) or sound signal samples classified in the "unclear signal type" category (FIG. 7), the time-domain excitation contribution does not always contribute much to the coding improvement compared to the frequency-domain coding. Often, it does improve coding of the lower part of the spectrum while the coding improvement in the higher part of the spectrum is minimal. The mixed time-domain/frequency domain encoder 120/720 comprises a cut-off frequency finder and filter 108 (FIGS. 1 and 7) for performing an operation 158 of determining a cut-off frequency above which coding improvement afforded by the time-domain excitation contribution becomes too low to be valuable. The cut-off frequency finder and filter 108 comprises, as illustrated in FIG. 2, a calculator of cut-off frequency 215 and a filter 216.

An operation 265 of estimating the cut-off frequency of the time-domain excitation contribution is first completed by the calculator 215 (FIG. 2) using a computer 303 (FIGS. 3 and 4) performing an operation 353 of normalized cross-correlation for each frequency band between the frequency transform of the input LP residual 301 from calculator 107 and the frequency transform of the time-domain excitation contribution 302 from calculator 106, respectively designated $f_{res}$ and $f_{exc}$ which are defined in the foregoing Section 4. The last frequency $L_f$ included in each of, for example, the sixteen (16) frequency bands are defined in Hz as:

$$L_f=\begin{Bmatrix}175, 375, 775, 1175, 1575, 1975, 2375, 2775,\\ 3175, 3575, 3975, 4375, 4775, 5175, 5575, 6375\end{Bmatrix}$$

For this illustrative example, the number of frequency bins j per band $B_b$, the cumulative frequency bins per band $C_{Bb}$, and the normalized cross-correlation $C_c$(i) per frequency band i are defined, for example, as follows, for a 20 ms frame at 12.8 kHz internal sampling rate:

$$B_b=\begin{Bmatrix}8, 8, 16, 16, 16, 16, 16, 16\\ 16, 16, 16, 16, 16, 16, 16, 32\end{Bmatrix}C_{Bb}=\begin{Bmatrix}0, 8, 16, 32, 48, 64, 80, 96,\\ 112, 128, 144, 160, 176, 192, 208, 224\end{Bmatrix}$$

$$C_C(i)=\frac{\sum_{j=C_{Bb}(i)}^{j=C_{Bb}(i)+B_b(i)} f_{exc}(j)\cdot f_{res}(j)}{\sqrt{\left(S'_{f_{exc}}(i)\cdot S'_{f_{res}}(i)\right)}}$$

Where $$S'_{f_{exc}}(i)=\sum_{j=C_{Bb}(i)}^{j=C_{Bb}(i)+B_b(i)} f_{exc}(j)^2$$

and $$S'_{f_{res}}(i)=\sum_{j=C_{Bb}(i)}^{j=C_{Bb}(i)+B_b(i)} f_{res}(j)^2$$

where $B_b$ is the number of frequency bins j per band $B_b$, $C_{Bb}$ is the cumulative frequency bins per band, $C_c(i)$ is the normalized cross-correlation per frequency band i, $S'_{f_{exc}}$ is the excitation energy for a band and similarly $S'_{f_{res}}$ is the residual energy per band.

The calculator of cut-off frequency 215 comprises a smoother 304 (FIGS. 3 and 4) of cross-correlation through the frequency bands performing some operations 354 to smooth the cross-correlation vector between the different frequency bands. More specifically, the smoother 304 of cross-correlation through the frequency bands computes a new cross-correlation vector $C_{c_2}$ using, for example, the following relation:

$$C_{c_2}(i) = \begin{cases} 2\cdot(\min(0.5, \alpha\cdot C_c(0) + \delta C_c(1)) - 0.5) & \text{for } i = 0 \\ 2\cdot(\min(0.5, \alpha\cdot C_c(i) + \beta C_c(i+1) + \beta C_c(i-1)) - 0.5) & \text{for } 1 \le i < N_b \end{cases}$$

where, in an illustrative embodiment, $$\alpha = 0.95;$$

$$\delta = (1 - \alpha);$$

$$N_b = 13;$$

$$\beta = \delta / 2$$

The calculator of cut-off frequency 215 further comprises a calculator 305 (FIGS. 3 and 4) performing an operation 355 of calculating an average of the new cross-correlation vector $C_{c_2}$ over the first $N_b$ bands (for example $N_b$=13 representing 5575 Hz).

Figure 3:
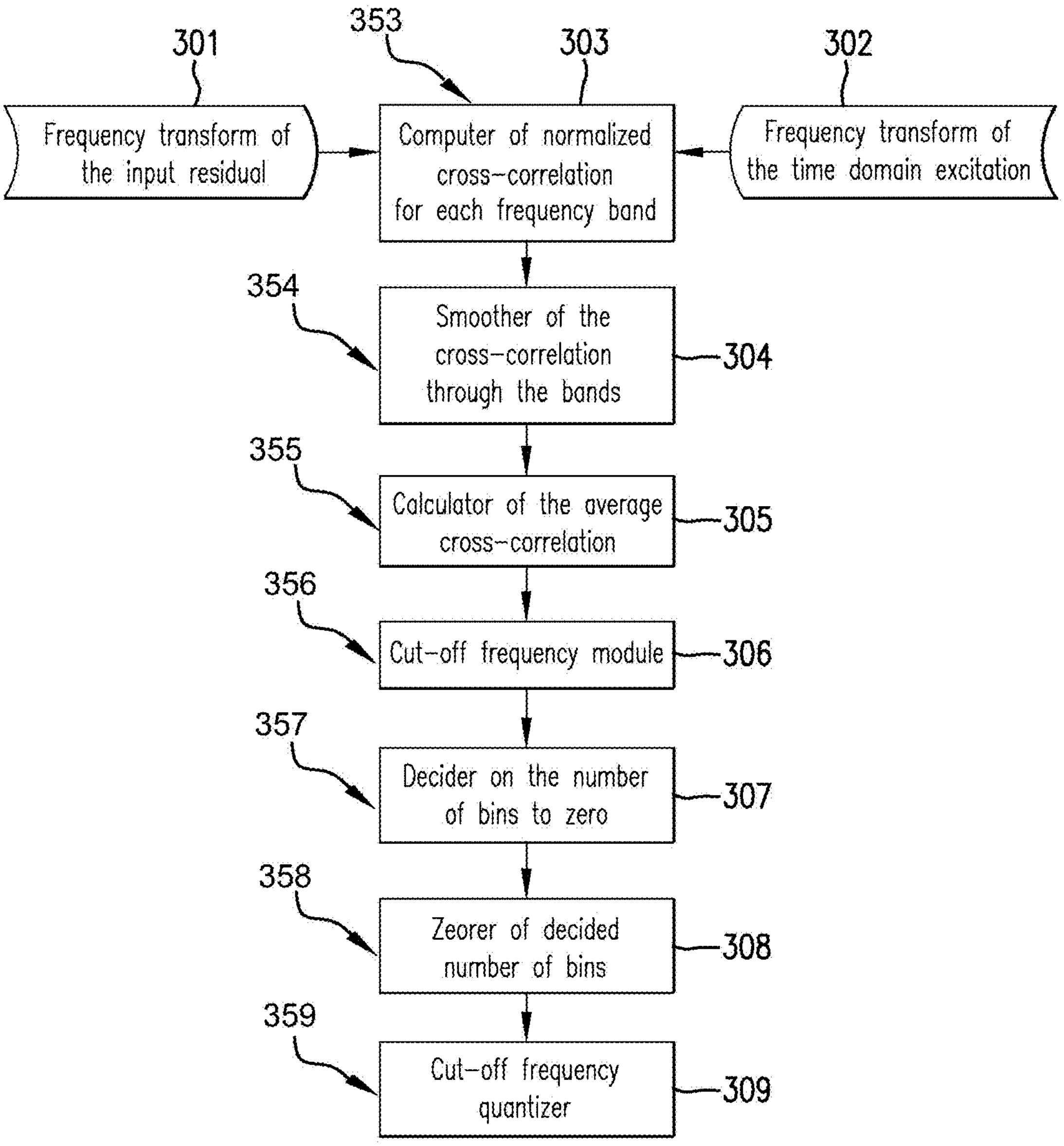
FIG.3 PRIOR ART
FIG. 3 is a schematic block diagram illustrating concurrently an overview of a calculator of cut-off frequency of a time-domain excitation contribution and of a corresponding operation of estimating the cut-off frequency.
Figure 4:
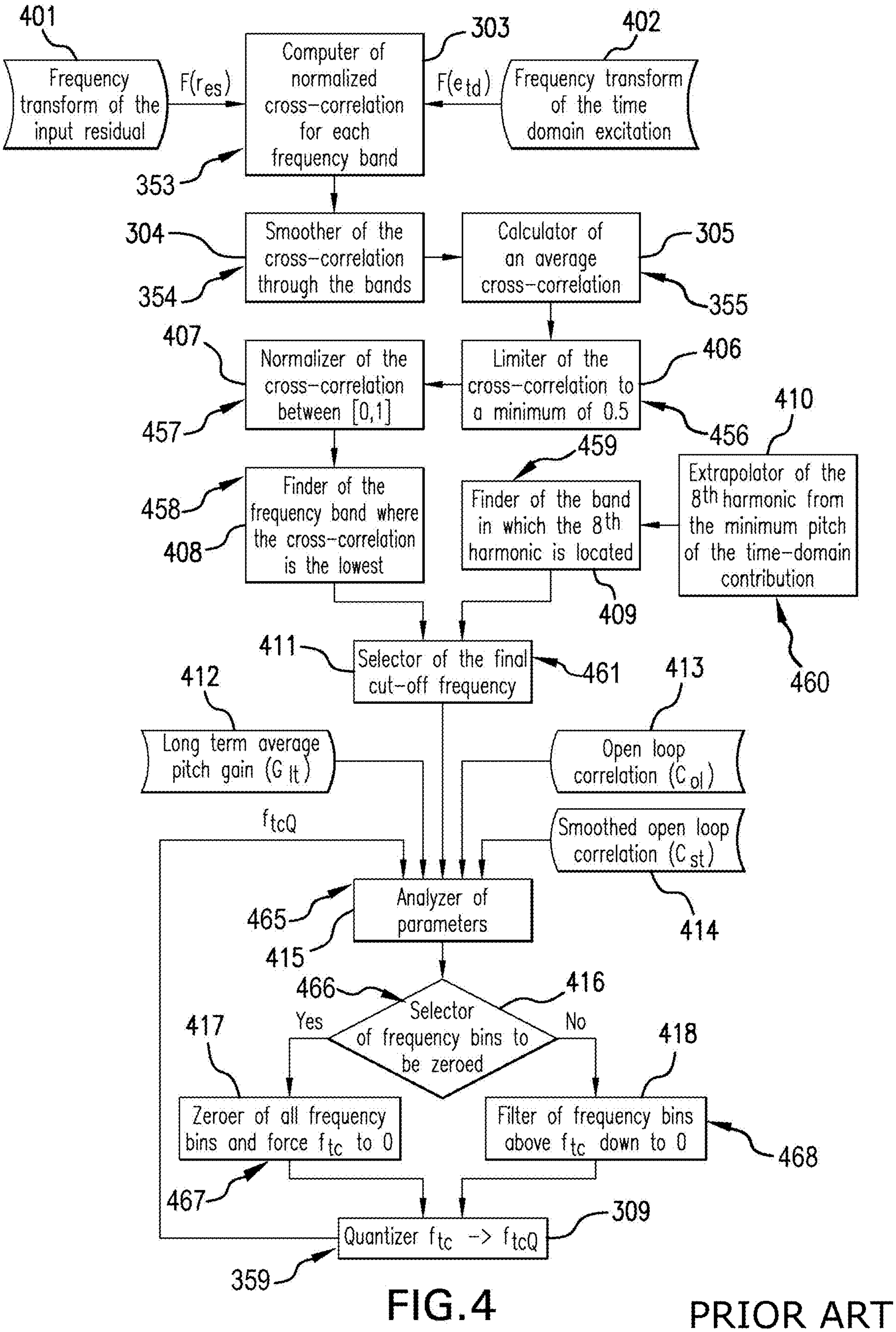
FIG.4 PRIOR ART
FIG. 4 is a schematic block diagram illustrating a more detailed structure of the calculator of cut-off frequency of FIG. 3, and of the corresponding operation of estimating the cut-off frequency.

The calculator 215 of cut-off frequency also comprises a cut-off frequency module 306 (FIG. 3) including, as illustrated in FIG. 4, a limiter 406 of the cross-correlation, a normaliser 407 of the cross-correlation and a finder 408 of the frequency band where the cross-correlation is the lowest. More specifically, the limiter 406 performs an operation 456 of limiting the average of the cross-correlation vector $C_{c_2}$ to a minimum value of 0.5 and the normaliser 407 performs an operation 457 of normalising the limited average of the cross-correlation vector $C_{c_2}$ between 0 and 1. The finder 408 performs an operation 458 of obtaining a first estimate of the cut-off frequency by finding the last frequency $L_f$ of a frequency band i which minimizes the difference between the said last frequency $L_f$ of a frequency band i and the normalized average $\overline{C_{c_2}}$ of the cross-correlation vector $C_{c_2}$ multiplied by half the internal sampling rate ($F_s/2$) of the input sound signal 101:

$$i_{min} = \min_{0 \le i < N_b}\left(L_f(i) - \overline{C_{c_2}}\cdot\left(\frac{F_s}{2}\right)\right)$$

and $$f_{tc_1} = L_f(i_{min})$$

where $$F_s = 12800 \text{ Hz}$$

and

-continued $$\overline{C_{c_2}} = \frac{\sum_{i=0}^{i=N_b-1}(C_{c_2}(i))}{N_b}$$

In the above relations, $f_{tc_1}$ represents the first estimate of the cut-off frequency.

At low bitrate, where the normalized average $\overline{C_{c_2}}$ is never really high (in the case of the unified time-domain/frequency-domain coding device 100 and method 150 of FIG. 1), or when the sub-mode flag $F_{tfsm}$ is greater than "0", meaning that the input sound signal is categorized as "unclear signal type" (in the case of the unified time-domain/frequency-domain coding device 700 and method 750 of FIG. 7), or to artificially increase the value of $f_{tc_1}$ to give more weight to the time-domain excitation contribution, it is possible to upscale, using the normaliser 407, the value of the normalized average $\overline{C_{c_2}}$ with a fixed scaling factor. As a non-limitative example, at bitrate below 8 kbps, the first estimate of the cut-off frequency $f_{tc_1}$ is multiplied by 2.

The precision of the cut-off frequency may be improved by adding the following component to the computation. For that purpose, the cut-off frequency module 306 comprises an extrapolator 410 (FIG. 4) of the $8^{th}$ harmonic computed, in a corresponding operation 460, from the minimum or lowest pitch lag value of the time-domain excitation contribution of the sub-frames of the frame, using, for example, the following relation:

$$h_{8^{th}} = \frac{8\cdot F_s}{\min\limits_{0 \le i < N_{sub}}(T(i))}$$

where $F_s$=12800 Hz is the internal sampling rate or frequency, $N_{sub}$ is the number of sub-frames in a frame, and T(i) is the adaptive-codebook index or pitch lag for sub-frame i.

The cut-off frequency module 306 comprises a finder 409 (FIG. 4) of the frequency band in which the $8^{th}$ harmonic $h_{8^{th}}$ is located. More specifically, for the sub-frames $i<N_{sub}$, the finder 409 performs an operation 459 of searching for the highest frequency band for which, for example, the following inequality is still verified:

$$(h_{8^{th}} \ge L_f(i))$$

The index of that band will be called $i_{8^{th}}$ and it indicates the band where the $8^{th}$ harmonic is likely located.

The cut-off frequency module 306 finally comprises a selector 411 (FIG. 4) of the final cut-off frequency $f_{tc}$. More specifically, the selector 411 performs an operation 461 of retaining the higher frequency between the first estimate $f_{tc1}$ of the cut-off frequency from finder 408 and the last frequency of the frequency band in which the $8^{th}$ harmonic is located ($L_f(i_{8^{th}})$) from finder 409, using the following relation:

$$f_{tc} = \max(L_f(i_{8^{th}}), f_{tc1})$$

When coding sub-modes are used, in the case of the unified time-domain/frequency-domain coding device 700 and method 750 of FIG. 7, the cut-off frequency $f_{tc}$ is further thresholded using, for example, the following relation:

$$f_{tc} = \max(\max(L_f(i_{8^{th}}), 2775), f_{tc1})$$

As illustrated in FIGS. 3 and 4:

the calculator 215 of cut-off frequency further comprises a decider 307 (FIG. 3) for performing an operation 357 of deciding on the number of frequency bins of a frequency band to be zeroed;

the decider 307 itself includes an analyser 415 (FIG. 4) for performing an operation 465 of analysis of parameters, and a selector 416 (FIG. 4) for performing an operation 466 of selecting the frequency bins to be zeroed; and the filter 216 (FIG. 2) operates in frequency-domain and comprises, for performing a filtering operation 266, a zeroer 308 (FIG. 3). The corresponding operation 358 zeroes the frequency bins decided to be zeroed in decider 307. The zeroer 308 may zero (a) all the frequency bins (zeroer 417 and corresponding zeroing operation 467 in FIG. 4) or (b) the higher-frequency bins situated above the cut-off frequency $f_{tc}$ supplemented with a smooth transition region (filter 418 and corresponding filtering operation 468 in FIG. 4). The transition region is situated above the cut-off frequency $f_{tc}$ and below the zeroed bins, and it allows for a smooth spectral transition between the unchanged spectrum below the cut-off frequency $f_{tc}$ and the zeroed bins in higher frequencies.

As a non-limitative, illustrative example, when the cut-off frequency $f_{tc}$ from the selector 411 is below or equal to 775 Hz, the analyzer 415 considers that the cost of the time-domain excitation contribution is too high. The selector 416 then selects all the frequency bins of the frequency representation of the time-domain excitation contribution to be zeroed and the zeroer 417 forces to zero all the frequency bins and also force the cut-off frequency $f_{tc}$ to zero. All bits allocated to the time-domain excitation contribution are then reallocated to the frequency-domain coding mode. Otherwise, the analyzer 415 forces the selector 416 to choose the high-frequency bins above the cut-off frequency $f_{tc}$ for being zeroed by the filter (zeroer) 418.

Finally, the calculator 215 of cut-off frequency comprises a quantizer 309 (FIGS. 3 and 4) for performing an operation 359 of quantizing the cut-off frequency $f_{tc}$ into a quantized version $f_{tcQ}$ of this cut-off frequency for transmission to a distant decoder. If, for example, three (3) bits are associated to the cut-off frequency parameter, a possible set of output values can be defined (in Hz) as follows:

$$f_{tcQ}=\{0,1175,1575,1975,2375,2775,3175,3575\}$$

Many mechanisms could be used by the selector 411 to stabilize the choice of the final cut-off frequency $f_{tc}$ to prevent the quantized version $f_{tcQ}$ to switch between 0 and 1175 in inappropriate signal segment. To achieve this, as a non-restrictive example, the analyzer 415 is responsive to the long-term average pitch gain $G_{lt}$ 412 from the closed loop pitch analyzer 211 (FIG. 2), the open-loop pitch correlation $C_{ol}$ 413 from the open-loop pitch analyzer 203 and the smoothed open-loop pitch correlation $C_{st}$ 414. To prevent switching to frequency-domain coding only, the analyzer 415 does not allow such frequency-domain coding only when, for example, the following conditions are met, i.e. $f_{tcQ}$ cannot be set to 0:

$$f_{tc} > 2375 \text{ Hz}$$

or $$f_{tc} > 1175 \text{ Hz and } C_{ol} > 0.7 \text{ and } G_{lt} \geq 0.6$$

-continued or $$f_{tc} > 1175 \text{ Hz and } C_{st} > 0.8 \text{ and } G_{lt} \geq 0.4$$

or $$f_{tcQ}(t-1)! = 0 \text{ and } C_{ol} > 0.5 \text{ and } C_{st} > 0.5 \text{ and } G_{lt} \geq 0.6$$

where $C_{ol}$ is the open-loop pitch correlation 413 and $C_{st}$ corresponds to the smoothed version of the open-loop pitch correlation 414 defined as $C_{st}=0.9 \cdot C_{ol}+0.1 \cdot C_{st}$. Further, $G_{lt}$ (item 412 of FIG. 4) corresponds to the long-term average of the pitch gain obtained by the closed loop-pitch analyzer 211 within the time-domain excitation contribution. The long-term average of the pitch gain 412 is defined as $G_{lt}=0.9 \cdot \overline{G_p}+0.1 \cdot G_{lt}$, where $\overline{G_p}$ is the average pitch gain over the current frame. To further reduce the rate of switching between frequency-domain coding only and mixed time-domain/frequency-domain coding, a hangover can be added.

6) FREQUENCY-DOMAIN CODING

6.1) Creating a Difference Vector

Once the cut-off frequency $f_{tc}$ of the time-domain excitation contribution is determined, frequency-domain coding is performed. To perform such frequency-domain coding, the mixed time-domain/frequency domain coding method 170/770 comprises a subtracting operation 159, a frequency quantizing operation 160 and an adding operation 161. The mixed time-domain/frequency domain encoder 120/720 comprises a subtractor or calculator 109, a frequency quantizer 110 and an adder 111 to perform the operations 159, 160 and 161, respectively.

Figure 5:
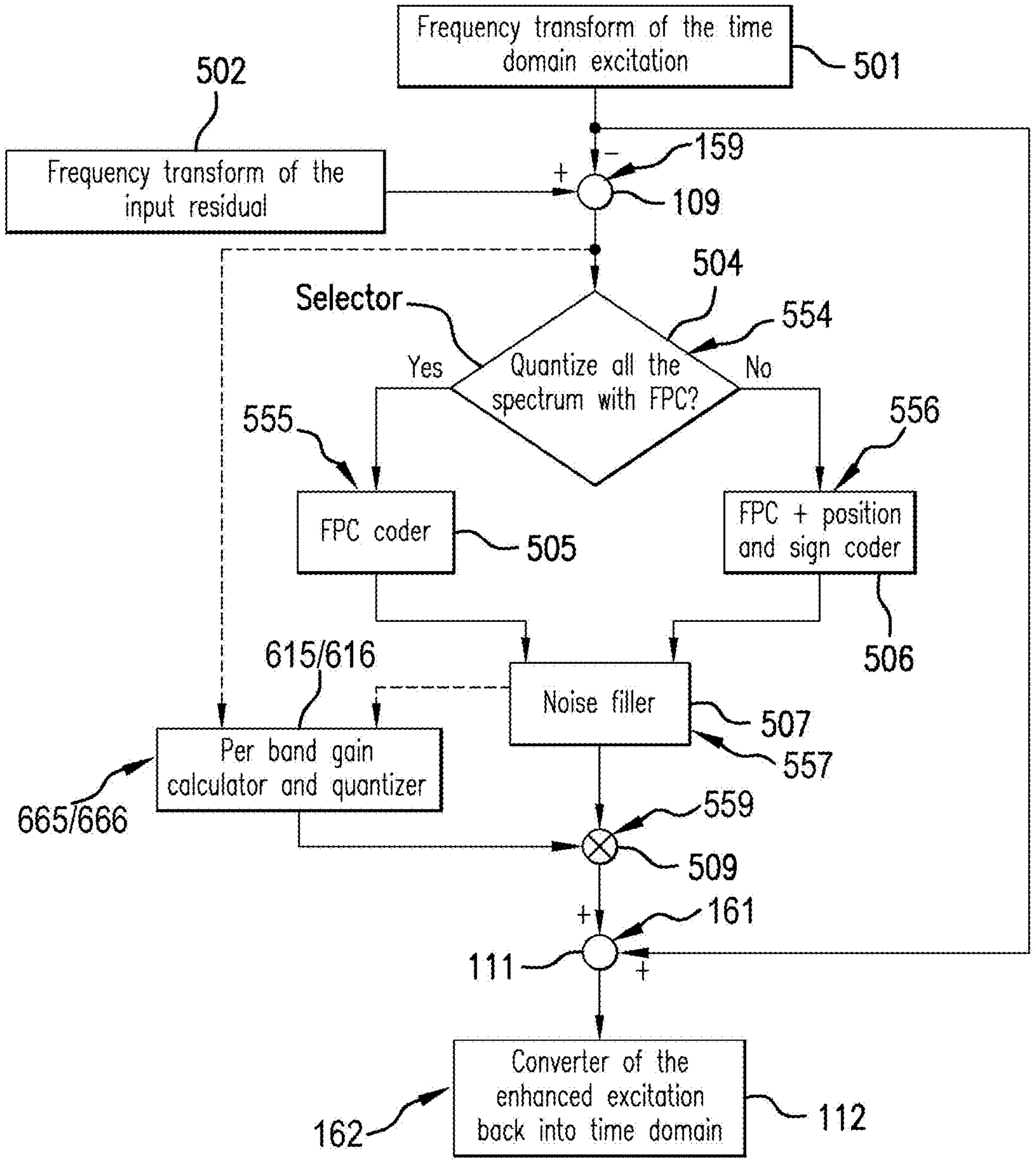
FIG.5 PRIOR ART
FIG. 5 is a schematic block diagram illustrating concurrently an overview of a frequency quantizer and of a corresponding frequency quantizing operation.
Figure 6:
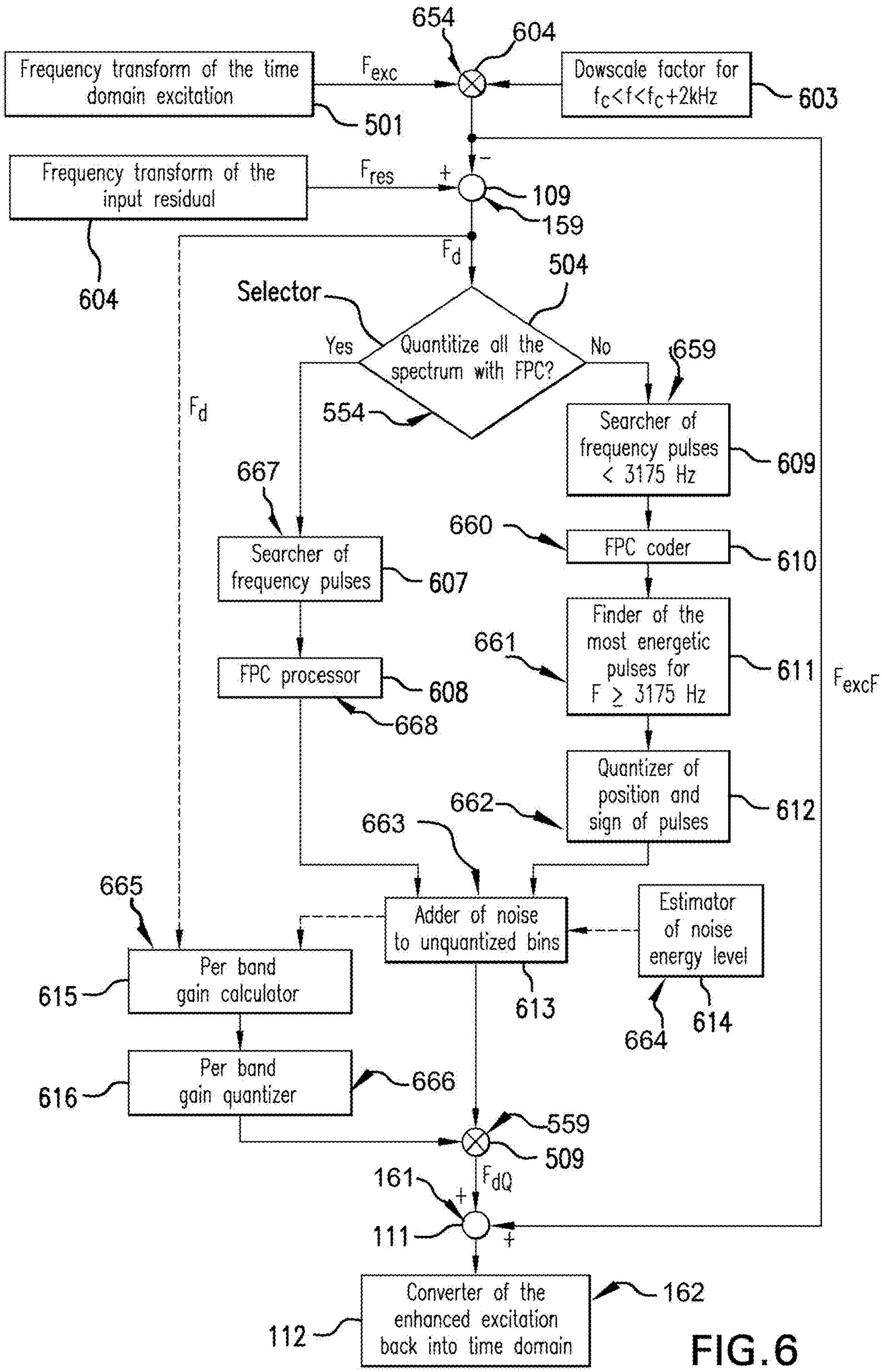
FIG.6 PRIOR ART
FIG. 6 is a schematic block diagram of a more detailed structure of the frequency quantizer of FIG. 5 and the frequency quantizing operation.

FIG. 5 is a schematic block diagram illustrating concurrently an overview of a frequency quantizer 110 and corresponding frequency quantizing operation 160. Also, FIG. 6 is a schematic block diagram of a more detailed structure of the frequency quantizer 110 and corresponding frequency quantizing operation 160.

The subtractor or calculator 109 (FIGS. 1, 2, 5 and 6) forms a first portion of a difference vector $f_d$ with the difference between the frequency transform $f_{res}$ 502 (FIGS. 5 and 6) (or other frequency representation) of the input LP residual from DCT 213 (FIG. 2) and the frequency transform $f_{exc}$ 501 (FIGS. 5 and 6) (or other frequency representation) of the time-domain excitation contribution from DCT 214 (FIG. 2) from zero up to the cut-off frequency $f_{tc}$ of the time-domain excitation contribution. A downscale factor 603 (FIG. 6) may be applied (see multiplier 604 and corresponding multiplying operation 654) to the frequency transform $f_{exc}$ 501 for the next transition region of $f_{trans}$=2 kHz (80 frequency bins in this example of implementation) before the respective spectral portion of the frequency transform $f_{res}$ 502 is subtracted therefrom. The result of the subtraction constitutes a second portion of the difference vector $f_d$ representing a frequency range from the cut-off frequency $f_{tc}$ up to $f_{tc}+f_{trans}$. The frequency transform $f_{res}$ 502 of the input LP residual is used for the remaining third portion of the difference vector $f_d$.

The downscaled part of the difference vector $f_d$ resulting from application of the downscale factor 603 can be performed with any type of fade out function, it can be shortened to only a few frequency bins, but it could also be omitted when the available bit budget is judged sufficient to prevent energy oscillation artifacts when the cut-off frequency $f_{tc}$ is changing. For example, with a 25 Hz resolution, corresponding to 1 frequency bin $f_{bin}$=25 Hz in 256 points DCT at 12.8 kHz internal sampling rate, the difference vector can be built as:

$$f_d(k) = f_{res}(k) - f_{exc}(k)$$

$$\text{where } 0 \leq k \leq f_{tc} / f_{bin}$$

$$f_d(k) = f_{res}(k) - f_{exc}(k) \cdot \left(1 - \sin\left(\frac{\pi}{2} \cdot \frac{f_{bin}}{f_{trans}} \cdot \left(k - \frac{f_{tc}}{f_{bin}}\right)\right)\right)$$

$$\text{where } f_{tc} / f_{bin} < k \leq (f_{tc} + f_{trans}) / f_{bin}$$

$$f_d(k) = f_{res}(k), \text{ otherwise}$$

where $f_{res}$, $f_{exc}$ and $f_{tc}$ have been defined in the foregoing description.

6.2) Frequency-Domain Bit Allocation for Coding Sub-Modes 6.2.1) Allocating a Fraction of the Available Bits to Lower Frequencies In the unified time-domain/frequency-domain CELP coding method 750 as illustrated in FIG. 7, the mixed time-domain/frequency domain encoder 720 comprises a band selector and bit allocator 707 and the mixed time-domain/frequency domain coding method 770 comprises a corresponding operation of band selection and bit allocation detection 757.

Figure 9:
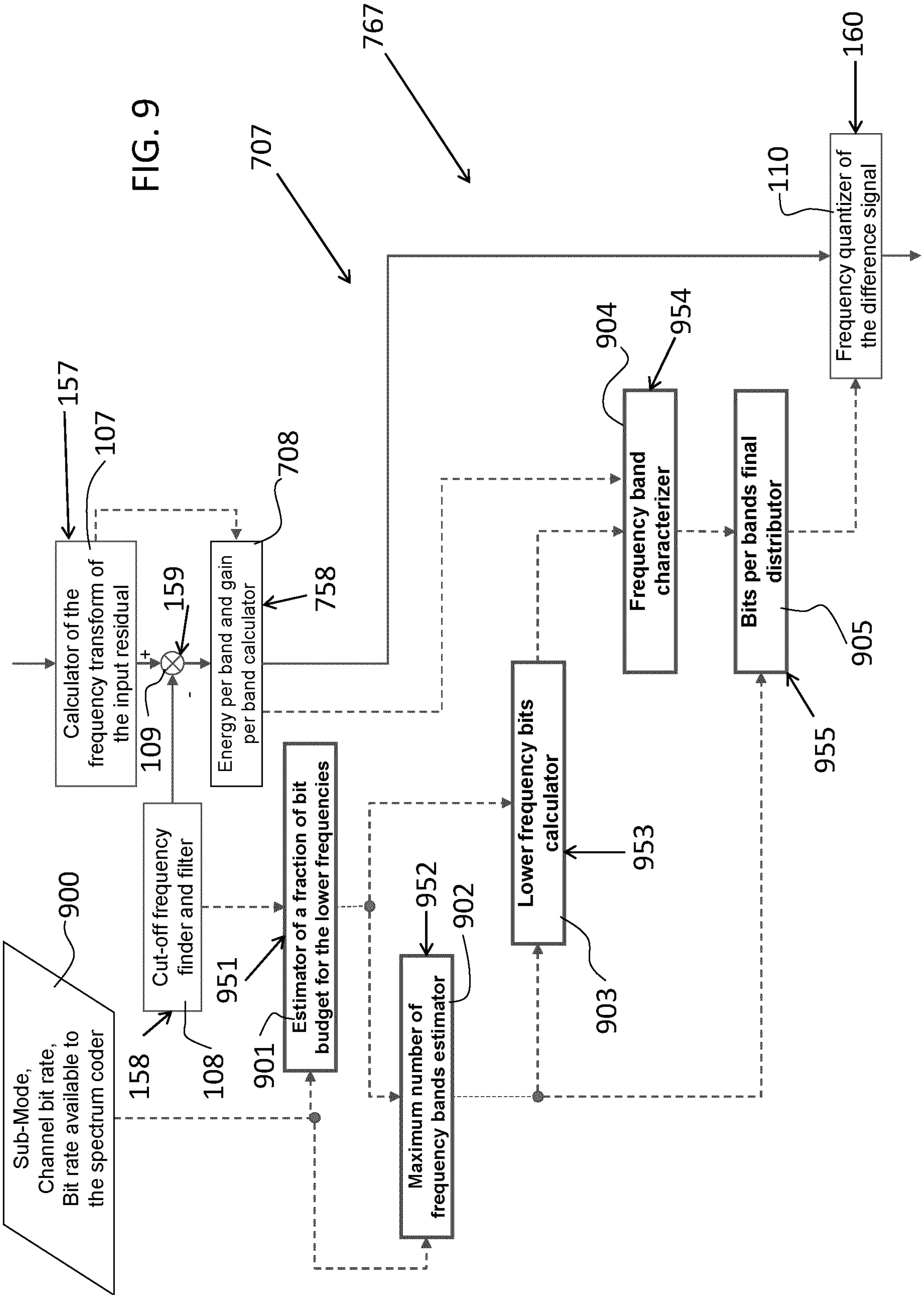
FIG. 9 is a schematic block diagram illustrating concurrently a band selector and bit allocator and a corresponding operation of band selection and bit allocation for distributing the available bit budget to a frequency-domain coding mode when the input sound signal is not categorized as speech nor as music in the alternative implementation of FIGS. 7 and 8.

FIG. 9 is a schematic block diagram illustrating concurrently the band selector and bit allocator 707 and the corresponding operation 757 of band selection and bit allocation of FIG. 7 for distributing the available bit budget to frequency quantization of the difference vector $f_d$ when the input sound signal 101 is not categorized as speech nor as music in the alternative implementation of unified time-domain/frequency-domain CELP coding method 150/750 of FIGS. 7 and 8.

Specifically, FIG. 9 shows an innovative way how the band selector and bit allocator 707 may distribute the available bits to the frequency quantization when the input sound signal 101 is not categorized as speech nor as music, but in the "unclear signal type", depending on the previously chosen coding sub-modes. In FIG. 9, the frequency quantization is performed on a per band manner. For matter of simplicity, the frequency bands have the same number of frequency bins, which is sixteen (16) frequency bins, at a 12.8 kHz internal sampling rate in the current illustrative example. Frequency band "0" represents the lower part of the spectrum while frequency band "15" represents the higher part of that spectrum.

To make the best possible use of the bits available for the frequency quantization, the band selection and bit allocation operation 757 comprises a first operation 951 of pre-fixing a fraction of the available bit budget (see 900) for quantizing the lower frequencies of the difference vector $f_d$ as a function of the quantized cut-off frequency $f_{tcQ}$ from the cut-off frequency finder and filter 108. To perform operation 951, an estimator 901 uses, for example, the following relation:

$$P_{Blf} = \frac{\left(-0.125 * \frac{L_f(f_{tcQ})}{25} + 76\right)}{100}$$

$$P_{Blf} = \max(\min(P_{Blf}, 0.75), 0.5)$$

where $P_{Blf}$ is the fraction of the available bits allocated to frequency quantizing of the lower frequencies of the difference vector $f_d$. In this example, the lower frequencies refer to the first five (5) frequency bands, or the first two (2) kHz. The term $L_f(f_{tcQ})$ refers to the number of frequency bins up to the quantized cut-off frequency $f_{tcQ}$.

Then, the estimator 901 adjusts the fraction of the available bits allocated to frequency quantizing of the lower frequencies $P_{Blf}$ based on the coding sub-mode flag $F_{tfsm}$. If the coding sub-mode flag $F_{tfsm}$ is set to "2" (FIG. 8), meaning that the likelihood of a temporal attack is detected in the current frame of the input sound signal 101, then the fraction of bits allocated to frequency quantizing of the lower frequencies $P_{Blf}$ is increased by 10% of the available bits. If "music" like characteristics are detected in the content of the current frame, indicated by a sub-mode coding flag $F_{tfsm}$ being set to "3", the fraction of bits allocated to frequency quantizing of the lower frequencies $P_{Blf}$ is decreased by 10% of the available bits.

6.2.2) Estimating the Number of Frequency Bands to Quantize

Another parameter that affects the overall number of bits per frequency band available for frequency quantizing the difference vector $f_d$, is an estimated maximum number $N_{Bmx}$ of frequency bands of this difference vector $f_d$ to quantize. In the presently described illustrative example, at an internal sampling rate of 12.8 kHz, the maximum total number $N_{tt}$ of frequency bands is sixteen (16).

When the coding sub-modes are used, the band selection and bit allocation operation 757 comprises an operation 952 of estimating the maximum number $N_{Bmx}$ of frequency bands of the difference vector $f_d$ to quantize. To perform operation 952, an estimator 902 sets, if the coding sub-mode flag $F_{tfsm}$ is set to "1" (first coding sub-mode being selected), the maximum number $N_{Bmx}$ of frequency bands to "10". If the coding sub-mode flag $F_{tfsm}$ is set to "2" (second coding sub-mode being selected), then the estimator 902 sets the maximum number $N_{Bmx}$ of frequency bands to "9". If the coding sub-mode flag $F_{tfsm}$ is set to "3" (third coding sub-mode being selected), then the estimator 902 sets the maximum number $N_{Bmx}$ of frequency bands to "13". The estimator 902 then readjusts the maximum number $N_{Bmx}$ of frequency bands to quantize as a function of the bit budget available for the frequency quantization of the difference vector $f_d$ using, for example, the following relations:

$$N_{Badj} = \begin{cases} 0.0125 \cdot B_F - 0.75 & F_{tfsm} = 1 \ \& \ B_T < 15000, \\ 0.02 \cdot B_F - 1.2 & F_{tfsm} \neq 2 \ \& \ B_T > 20000, \\ 1 & \text{otherwise} \end{cases}$$

$$N_{Bmx} = \max(\min(trunc\,(N_{Bmx} \cdot N_{Badj} + 0.5), N_{tt}), 5),$$

where $B_F$ represents the number of bits available for frequency quantization of the difference vector $f_d$ (see 900), $B_T$ is the total bitrate available to code the channel under processing (see 900), $F_{tfsm}$ is the sub-mode flag (see 900), and $N_{tt}$ is the maximum total number of frequency bands.

The estimator 902 can further reduce the maximum number of frequency bands of the difference vector $f_d$ to quantize in relation to the number of bits allocated to quantizing of middle and higher frequency bands of the difference vector $f_d$. For the purpose of such limitation, the last lower frequency band and the first frequency band thereafter are assumed to have a similar number of bits $m_b$ or roughly 17% of the bits $P_{B1f}$ allocated to frequency quantizing of the lower frequencies. For the last frequency band to be quantized, a minimum number of 4.5 bits $m_p$ is used to quantize at least one (1) frequency pulse. If the available bitrate $B_T$ is greater than or equal to 15 kbps, then the minimum number of bits $m_p$ will be nine (9) to allow for the quantizing of more pulses per frequency band. However, if the total available bitrate $B_T$ is below 15 kbps but the sub-mode flag $F_{tfsm}$ is set to "3", meaning content having similarities to music, then the number of bits $m_p$ of the last frequency band to be frequency quantized will be 6.75 to allow for a more precise quantization. Then, the estimator 902 computes a corrected maximum number of frequency bands $N'_{Bmx}$ using, for example, the following relation:

$$N'_{Bmx} = \min\left(N_{Bmx},\ 5 + \left((B_F - P_{Blf} \cdot B_F)/0.5 \cdot (m_p + m_b)\right)\right)$$

where $N'_{Bmx}$ corresponds to the corrected maximum number of frequency bands to quantize, $N_{Bmx}$ is the estimated maximum number of frequency bands, the number "5" represents the minimum number of frequency bands, $B_F$ represents the number of bits available for frequency quantization of the difference vector $f_d$, $P_{Blf}$ is the fraction of bits allocated to quantizing of the five (5) lower frequency bands, $m_p$ is the minimum number of bits allocated to frequency quantize a frequency band, and $m_b$ the number of bits allocated to quantizing the first frequency band after the five (5) lower frequency bands.

After the computation of the maximum number of frequency bands, the estimator 902 may perform an additional verification such that $m_p$ remains lower or equal to $m_b$. While this additional verification is an optional step, at low bitrate, it helps to allocate the bits more efficiently between the frequency bands of the difference vector $f_d$.

6.2.3) Revising the Number of Bits Allocated to Lower Frequencies

The band selection and bit allocation operation 757 comprises an operation 953 of calculating low frequency bits. To perform operation 953, a calculator 903 is provided. If the computation of the maximum number of frequency bands $N'_{Bmx}$ leads to a smaller number of frequency bands to quantize, the calculator 903 re-allocates the portion of bits previously allocated to the higher frequency bands such that is no longer relevant to quantizing of the lower frequency bands using, for example, the following relation:

$$B_{LF} = P_{Blf} \cdot B_F + \left(0.5 \cdot (m_p + m_b) \cdot (N_{Bmx} - N'_{Bmx})\right),$$

where $B_{LF}$ corresponds to the bits allocated to the five (5) lower frequency bands, $B_F$ corresponds to the number of bits available for frequency quantizing the lower frequencies of the difference vector $f_d$, $P_{Blf}$ is the above mentioned fraction of bits from estimator 901 allocated, for example, to frequency quantizing of the five (5) lower frequency bands, $m_p$ is the minimum number of bits allocated to quantize a frequency band, and $m_b$ the number of bits allocated to quantizing the first frequency band after the five (5) lower frequency bands.

6.2.4) Dual Sorting of Frequency Bands

The band selection and bit allocation operation 757 comprises an operation 954 of frequency band characterization. To perform operation 954, the band selector and bit allocator 707 comprises a frequency band characterizer 904 which, once the bitrate is distributed between the lower frequency bands and the rest of the frequency bands, performs a dual sorting of the frequency bands, to decide the importance of each band. The first sorting comprises finding whether one or more bands have a lower energy compared to their neighbor frequency bands. When it happens, the characterizer 904 marks these bands such that only the pre-determined minimum number of bits $m_p$ can be allocated to frequency quantizing these low energy frequency bands, even if the available bit budget is high. The second sorting comprises performing a position sorting of the middle and higher energy frequency bands, for example in decreasing energy order. These first and second sorting (dual sorting) are not performed for the lower frequency bands but are performed up to the maximum number of frequency bands $N'_{Bmx}$. The operation 954 of frequency band characterization can be summarized as follows:

$$P_{pb}(i) = \begin{Bmatrix} 1 & E(i-1) > E(i) < E(i+1) \\ 2 & \text{otherwise} \end{Bmatrix}_{7 \le i < N'_{Bmx}}$$

$$E_{P_{max}}(i) = POS\left(\max\left\{\left(E(j)\right)_{i \le j < N'_{Bmx}}\right\}\right)_{7 \le i < N'_{Bmx}}$$

$$E(i) = \log_{10}\left(\sqrt{\sum_{j=C_{Bb}(i)}^{j=C_{Bb}(i)+B_b(i)} f_d(j)^2}\right)$$

where $P_{pb}(i)$ is set to "1" for frequency bands where only the minimum number of bits $m_p$ will be used, $E_{P_{max}}(i)$ contains the position of the middle and higher energy frequency bands in decreasing energy order, and E(i) corresponds to the energy of each band. $C_{Bb}$ and $B_b$ are defined herein above in Section 5. The difference vector $f_d$ has been defined in Section 6.1.

The energy E(i) of each frequency band of the difference vector $f_d$ is computed in a calculator 708 and corresponding operation 758 of FIGS. 7 and 9. Calculator 708 and operation 758 also compute a gain per frequency band as described with reference to calculator 615 and operation 665 of FIG. 6. The energy E(i) of each frequency band of the difference vector $f_d$ and the gain for each frequency band are quantized for example as described in relation to quantizer 616 and operation 666 of FIG. 6, and both transmitted to a distant decoder. In the case of the implementation of FIG. 7 for the unified time-domain/frequency-domain coding device 700 and method 750, calculator 708 and operation 758 replaces calculator 615 and operation 665 as well as quantizer 616 and operation 666.

6.2.5) Distributing Bits to Selected Bands

The band selection and bit allocation operation 757 comprises an operation 955 of final distribution of bits per frequency band. To perform operation 955, the band selector and bit allocator 707 comprises a bits per frequency band final distributor 905.

Once the frequency bands have been characterized, the distributor 905 allocates the bitrate or number of bits $B_F$ available to frequency quantize the difference vector $f_d$ among selected frequency bands.

In the non-limitative example, for the first five (5) lower frequency bands, the distributor 905 linearly distributes the bits $B_{LF}$ allocated to frequency quantize the lower frequencies, with the first lowest frequency band receiving 23% of the bits $B_{LF}$ and the fifth ($5^{th}$) lower frequency band receiving the last 17% of the bits $B_{LF}$. In this manner, the lower frequencies of the spectrum of the difference vector $f_d$ can be quantized with sufficient accuracy to recover a better quality synthesis of the input sound signal 101.

The distributor 905 distributes the remaining bits $B_F$ allocated to frequency quantize the difference vector $f_d$ over the other, middle and higher frequency bands as a linear function but again taking into consideration the previous frequency band energy characterization (operation 954) such that more bits can be allocated to higher energy frequency bands and less bits to the frequency bands having a lower energy compared to the energy of its neighbor frequency bands and, thereby, making a more relevant use of the available bits by quantizing with more precision more important portions of the spectrum of the difference vector $f_d$. As a non-limitative example, the following relation illustrates how the bit distribution (operation 955) can be performed:

$$B_p(i) = \left\{ \begin{array}{ll} (0.23 - i \cdot 0.015) \cdot B_{LF} & 0 \le i < 5 \\ m_p & 5 \le i \le N'_{Bmx} \ \& \ P_{pb}(i) = 1 \\ m_{lb}(i) & \text{otherwise} \end{array} \right\}$$

$$m_{lb}(i) = \left(\frac{2 \cdot (B_F - B_{LF})}{(N'_{Bmx} - 5)}\right) - m_p - \left(\frac{2 \cdot (B_F - B_{LF}) - 2 \cdot m_p \cdot (N'_{Bmx} - 5)}{(N'_{Bmx} - 5)^2}\right) \cdot (i - 4),$$

where $B_p(i)$ represents the number of bits allocated per frequency band i, $B_F$ represents the number of bits available to frequency quantize the difference vector $f_d$, $B_{LF}$ corresponds to the bitrate or bits allocated to the five (5) lower frequency bands, $m_p$ is the minimum number of bits to quantize a frequency pulse in a frequency band, $P_{pb}(i)$ contains the position where the minimum number $m_p$ of bits will be used, and $N'_{Bmx}$ is the maximal number of frequency bands to be quantized.

If, after operation 955, there are some bits not allocated, the distributor 905 will allocate them to the lower frequency bands. As a non-limitative example, the distributor 905 will allocate one remaining bit per frequency band starting from the fifth ($5^{th}$) band and going back to the first band and repeating this procedure if needed to allocate all the remaining bits.

Later, the distributor 905 may have to floor, truncate or round the number of bits per frequency band depending on the algorithm being used to perform the quantizing of the frequency pulses and potential fixed-point implementation.

6.3) Searching for Frequency Pulses

The mixed time-domain/frequency-domain CELP coding method 170/770 comprises an operation of frequency quantizing 160 (FIGS. 1, 2 and 7) the difference vector $f_d$. To perform operation 160, the mixed time-domain/frequency-domain CELP encoder 120/720 comprises a frequency quantizer 110 (219 in FIG. 2).

The difference vector $f_d$ can be quantized using several methods. In every case, frequency pulses have to be searched for and quantized. In one possible implementation, the frequency quantizer 110 searches for the most energetic pulses of the difference vector $f_d$ across the spectrum. The method to search the pulses can be as simple as splitting the spectrum into frequency bands and allowing a certain number of pulses per frequency band. The number of pulses per frequency bands depends on the bit budget available and on the position of the frequency band inside the spectrum. Typically, more pulses are allocated to the lower frequencies.

6.4) Quantized Difference Vector

Depending on the bitrate available, the quantization of the frequency pulses can be performed by the frequency quantizer 110 using different techniques. In one embodiment, at bitrate below 12 kbps, a simple search and quantization scheme can be used to code the position and sign of the pulses. This scheme is described herein below as a non-limitative example.

For frequencies lower than 3175 Hz, the simple search and quantization scheme uses an approach based on factorial pulse coding (FPC) which is described in the literature, for example in Reference [8], of which the full content is incorporated herein by reference.

More specifically, referring to FIGS. 5 and 6, the frequency quantizer 110 comprises a selector 504 to perform an operation 554 of determining whether all the spectrum is quantized using FPC. As illustrated in FIG. 5, if the selector 504 determines that all the spectrum is not quantized using FPC, an operation 556 of FPC coding and pulse position and sign coding is performed in a coder 506.

As illustrated in FIG. 6, the operation 556 of FPC coding and pulse position and sign coding comprises a frequency pulse searching operation 659, a FPC coding operation 660, an operation 661 of finding most energetic pulses, and an operation 662 of quantizing the position and sign of frequency pulses. To perform operations 659-662, the coder 506 respectively comprises a searcher 609 of frequency pulses, a FPC coder 610, a finder 611 of most energetic pulses and a quantizer 612 of the position and sign of frequency pulses.

The searcher 609 searches frequency pulses through all the frequency bands for the frequencies lower than 3175 Hz. The FPC coder 610 then processes the frequency pulses. The finder 611 determines the most energetic pulses for frequencies equal to and larger than 3175 Hz, and the quantizer 612 codes the position and sign of the found, most energetic pulses. If more than one (1) pulse is allowed within a frequency band then the amplitude of the pulse previously found is divided by 2 and the search is again conducted over the entire frequency band. Each time a pulse is found, its position and sign are stored for quantization and the bit packing stage. The following pseudo code illustrates, as a non-limitative example, this simple search and quantization scheme:

```
for k = 0 : N_BD
  for i = 0 : N_p
    p_max = 0
    for j = C_Bb (k) : C_Bb (k) + B_b (k)
      if f_d (j)^2 > p_max
        p_max = f_d (j)^2
        f_d(j) = f_d(j) / 2
        p_p(i) = j
        p_s(i) = sign(f_d(j))
      end
    end
  end
end
```

where $N_{BD}$ is the number of frequency bands ($N_{BD}$=16 in the illustrative example), $N_p$ is the number of pulses i to be coded in a frequency band k, $B_b$ is the number of frequency bins per frequency band, $C_{Bb}$ is the cumulative frequency bins per band as defined previously in Section 5), $p_p$ represents the vector containing the pulse position found, $p_s$ represents the vector containing the sign of the pulse found and $p_{max}$ represents the energy of the pulse found.

At bitrates above 12 kbps, the selector 504 determines that all the spectrum is to be quantized using FPC (FIGS. 5 and 6). As illustrated in FIG. 5, an operation 555 of FPC coding is then performed in a FPC coder 505. Referring to FIG. 6, the coder 505 comprises a searcher 607 of frequency pulses and the operation 555 comprises a corresponding operation 667 of searching the frequency pulses. The search for frequency pulses is conducted through the entire frequency bands. The operation 555 comprises an operation 668 of coding the found frequency pulses and the coder 505 comprises, for performing operation 668, a FPC processor 608.

Then, the FPC processor 608 or the quantizer of position and sign of pulses 612 obtains the quantized difference vector $f_{dQ}$ by adding the number of pulses nb_pulses with the pulse sign $p_s$ to each of the position $p_p$ found. For each frequency band the quantized difference vector $f_{dQ}$ can be written using, for example, the following pseudo code:

$$\text{for } j = 0, \ldots, j < \text{nb\_pulses}$$
$$f_{dQ}(p_p(j)) += p_s(j)$$

6.5) Noise Filling

The frequency bands are quantized with more or less precision; the quantization method described in the previous section does not guarantee that all frequency bins within the frequency bands are quantized. This is especially the case at low bitrates where the number of pulses quantized per frequency band is relatively low. To prevent the apparition of audible artifacts due to these unquantized frequency bins, the frequency quantizer 110 comprises a noise filler 507 (FIG. 5) to perform a corresponding operation 557 of adding some noise in the unquantized frequency bins in order to fill these gaps. This noise addition may be made over all the spectrum at bitrate below 12 kbps, for example, but can be applied only above the cut-off frequency $f_{tc}$ of the time-domain excitation contribution for higher bitrates. For simplicity, the noise intensity varies only with the bitrate available. At high bitrates the noise level is low but the noise level is higher at low bitrates.

The noise filler 507 comprises an adder 613 (FIG. 6) which performs an operation 663 of adding noise to the quantized difference vector $f_{dQ}$ after the intensity or energy level of such added noise has been determined. For that purpose, the frequency quantizing operation 160 comprises an operation 664 of estimating the intensity or energy level of the added noise and the frequency quantizer 110 comprises, to perform operation 664, a corresponding estimator 614 of noise energy level. The operation 664 of estimating the intensity or energy level of the added noise is made by the estimator 614 and prior to an operation 665 of determining a gain per frequency band in a per band gain calculator 615 of the frequency quantizer 110.

In the illustrative embodiment, in the estimator 614, the noise level is directly related to the coding bitrate. For example, at 6.60 kbps the estimator 614 sets the noise level $N'_L$ to 0.4 times the amplitude of the frequency pulses coded in a specific frequency band and progressively down to a value of 0.2 times the amplitude of the frequency pulses coded in a frequency band at 24 kbps. The adder 613 injects the noise only to section(s) of the spectrum where a certain number of consecutives frequency bins has a very low energy, for example when the cumulative bins energy of half of a frequency band is below 0.5. For a specific frequency band i, the noise is injected for example as follows:

$$\text{for } j = C_{Bb}(i), \ldots, j < C_{Bb}(i) + B_b(i)$$
$$\quad \text{if } \sum_{k=j}^{j+N_z} f_{dQ}(k)^2 < 0.5$$
$$\quad\quad \text{for } k = j, \ldots, k < j + N_z$$
$$\quad\quad\quad f_{dQ}(k) = f_{dQ}(k) + N_L'(i) \cdot r_{and}(\,)$$
$$\quad j += N_z$$
$$\text{Where } N_z = \frac{B_b(i)}{2}$$

where, for a band i, $C_{Bb}$ is the cumulative number of frequency bins per frequency band, $B_b$ is the number of frequency bins in a specific band i, $N'_L$ is the level of the added noise, and $r_{and}$ is a random number generator which is limited between −1 to 1.

6.6) Per Band Gain Quantization

Referring to FIGS. 5 and 6, the frequency quantizing operation 160 of the unified time-domain/frequency-domain coding device 100 and method 150 comprises the operation 665 of determining a gain per frequency band followed by an operation 666 of quantizing the per band gain. The frequency quantizer 110 comprises, to perform operation 665 and 666, a per band gain calculator 615 and a per band gain quantizer 616.

Once the quantized difference vector $f_{dQ}$, including the noise fill if needed, is found, calculator 615 computes the gain per band for each frequency band. The per band gain for a specific band $G_b(i)$ is defined as the ratio between the energy of the unquantized difference vector $f_d$ to the energy of the quantized difference vector $f_{dQ}$ in the log domain using, for example, the following relations:

$$G_b(i) = \log_{10}\left(\frac{S_{f'_d}(i)}{S_{f'_{dQ}}(i)}\right)$$

$$\text{Where } S_{f'_d}(i) = \sum_{j=C_{Bb}(i)}^{j=C_{Bb}(i)+B_b(i)} f_d(j)^2 \text{ and}$$

$$S_{f'_{dQ}}(i) = \sum_{j=C_{Bb}(i)}^{j=C_{Bb}(i)+B_b(i)} f_{dQ}(j)^2$$

where $C_{Bb}$ and $B_b$ are defined hereinabove in Section 5).

The per band gain quantizer 616 vector quantizes the per band frequency gains. Prior to vector quantization, at low bitrate, the last gain (corresponding to the last frequency band) is quantized separately, and the remaining fifteen (15) per band gains (when, for example, a number 16 of frequency bands is used) are divided by the quantized last gain. Then, the normalized fifteen (15) remaining gains are vector quantized by the quantizer 616. At higher bitrate, the mean of the per band gains is quantized first and then removed from all per band gains of the, for example, sixteen (16) frequency bands prior the vector quantization of those per band gains. The vector quantization being used can be a standard minimization in the log domain of the distance between the vector containing the per band gains and the entries of a specific codebook.

In the frequency-domain coding mode, gains are computed in the calculator 615 for each frequency band to match the energy of the unquantized vector $f_d$ to the quantized vector $f_{dQ}$. The gains are vector quantized in quantizer 616 and applied per frequency band (operation 559) to the quantized vector $f_{dQ}$ through a multiplier 509 (FIGS. 5 and 6).

Alternatively, it is also possible to use the FPC coding scheme at rate below 12 kbps for the whole spectrum by selecting only some of the frequency bands to be quantized. Before performing the selection of the frequency bands, the energy $E_d$ of the frequency bands of the unquantized difference vector $f_d$, are quantized using quantizer 616. The energy is computed using, for example, the following relation:

$$E_d(i) = \log_{10}(S_d(i))$$

where $$S_d(i) = \sum_{j=C_{Bb}(i)}^{j=C_{Bb}(i)+B_b(i)} f_d(j)^2$$

where $C_{Bb}$ and $B_b$ are defined hereinabove in Section 5).

To perform the quantization of the frequency band energy $E'_d$, first the average energy over the first 12 frequency bands out of the sixteen bands being used is quantized and subtracted from all the sixteen (16) band energies. Then all the frequency bands are vectors quantized per group of 3 or 4 bands. The vector quantization being used can be a standard minimization in the log domain of the distance between the vector containing the gains per band and the entries of a specific codebook. If not enough bits are available, it is possible to only quantize the first 12 frequency bands and to extrapolate the last four (4) frequency bands using an average of the previous three (3) frequency bands or by any other methods.

Once the energy of frequency bands of the unquantized difference vector are quantized, it becomes possible to sort the energy in decreasing order in such a way that it would be replicable on the decoder side. During the sorting, all the energy bands below 2 kHz are always kept and then only the most energetic bands will be passed to the FPC scheme for coding frequency pulse amplitudes and signs. With this approach the FPC scheme codes a smaller vector but covering a wider frequency range. In others words, it takes less bits to cover important energy events over the entire spectrum.

In the particular case of implementation of the unified time-domain/frequency-domain coding device 700 and method 750 of FIG. 7, the frequency band selection and bit distribution is performed instead as determined by the energy per band and gain per band calculator 708 and calculating operation 758 and the band selector and bits allocator 707 and band selecting and bits allocating operation 757 of FIGS. 7 and 9 as described herein above.

After the pulse quantization process, a noise fill similar to what has been described earlier is performed. Then, a gain adjustment factor $G_a$ is computed per frequency band to match the energy $E_{dQ}$ of the quantized difference vector $f_{dQ}$ to the quantized energy $E'_d$ of the unquantized difference vector $f_d$. Then this per band gain adjustment factor is applied to the quantized difference vector $f_{dQ}$. This can be expressed as follows:

$$G_a(i) = 10^{E'_d(i)-E_{dQ}(i)}$$

where $$E_{dQ}(i) = \log_{10}\left(\sum_{j=C_{Bb}(i)}^{j=C_{Bb}(i)+B_b(i)} f_{dQ}(j)^2\right)$$

and $E'_d$ is the quantized energy per band of the unquantized difference vector $f_d$ as defined earlier After the completion of the frequency-domain coding stage, the total time-domain/frequency domain excitation is found. For that purpose, the mixed time-domain/frequency-domain CELP coding method 170/770 comprises an operation 161 of adding, using an adder 111 (FIGS. 1, 2, 5 and 6) of the mixed time-domain/frequency-domain CELP encoder 120/720, the frequency quantized difference vector $f_{dQ}$ from the frequency quantizer 110 to the filtered frequency-transformed time-domain excitation contribution $f_{excF}$. When the unified time-domain/frequency domain coding device 100/700 changes its bit allocation from a time-domain only coding mode to a mixed time-domain/frequency-domain coding mode, the excitation spectrum energy per frequency band of the time-domain only coding mode does not match the excitation spectrum energy per frequency band of the mixed time-domain/frequency domain coding mode. This energy mismatch can create switching artifacts that are more audible at low bitrate. To reduce any audible degradation created by this bit reallocation, a long-term gain can be computed for each band and can be applied to the summed excitation to correct the energy of each frequency band for a few frames after the reallocation. Then, the mixed time-domain/frequency-domain CELP coding method 170/770 comprises an operation 162 (FIGS. 1, 5 and 6) to transform the sum of the frequency quantized difference vector $f_{dQ}$ and the frequency-transformed and filtered time-domain excitation contribution $f_{excF}$ to time-domain using, for example, an IDCT (Inverse DCT) 220 (FIG. 2).

The unified time-domain/frequency domain coding method 150/750 comprises an operation 163/756 of producing a synthesized signal by filtering the total time-domain/frequency domain excitation from the IDCT 220 through a LP synthesis filter 113/706 (FIGS. 1, 2 and 7) of the coding device 100/700.

The quantized positions and signs of the frequency pulses forming the quantized difference vector $f_{dQ}$ are transmitted to the distant decoder (not shown).

In one non-limitative embodiment, while the CELP coding memories are updated on a sub-frame basis using only the time-domain excitation contribution, the total time-domain/frequency-domain excitation is used to update those memories at frame boundaries. In another possible implementation, the CELP coding memories are updated on a sub-frame basis and also at the frame boundaries using only the time-domain excitation contribution. This results in an embedded structure where the frequency-domain quantized signal constitutes an upper quantization layer independent of the core CELP layer. This presents advantages in certain applications. In this particular case, the fixed codebook is always used to maintain good perceptual quality, and the number of sub-frames is always four (4) for the same reason. However, the frequency-domain analysis can apply to the whole frame. This embedded approach works for bit rates around 12 kbps and higher.

7) DECODER DEVICE AND METHOD

Figure 11:
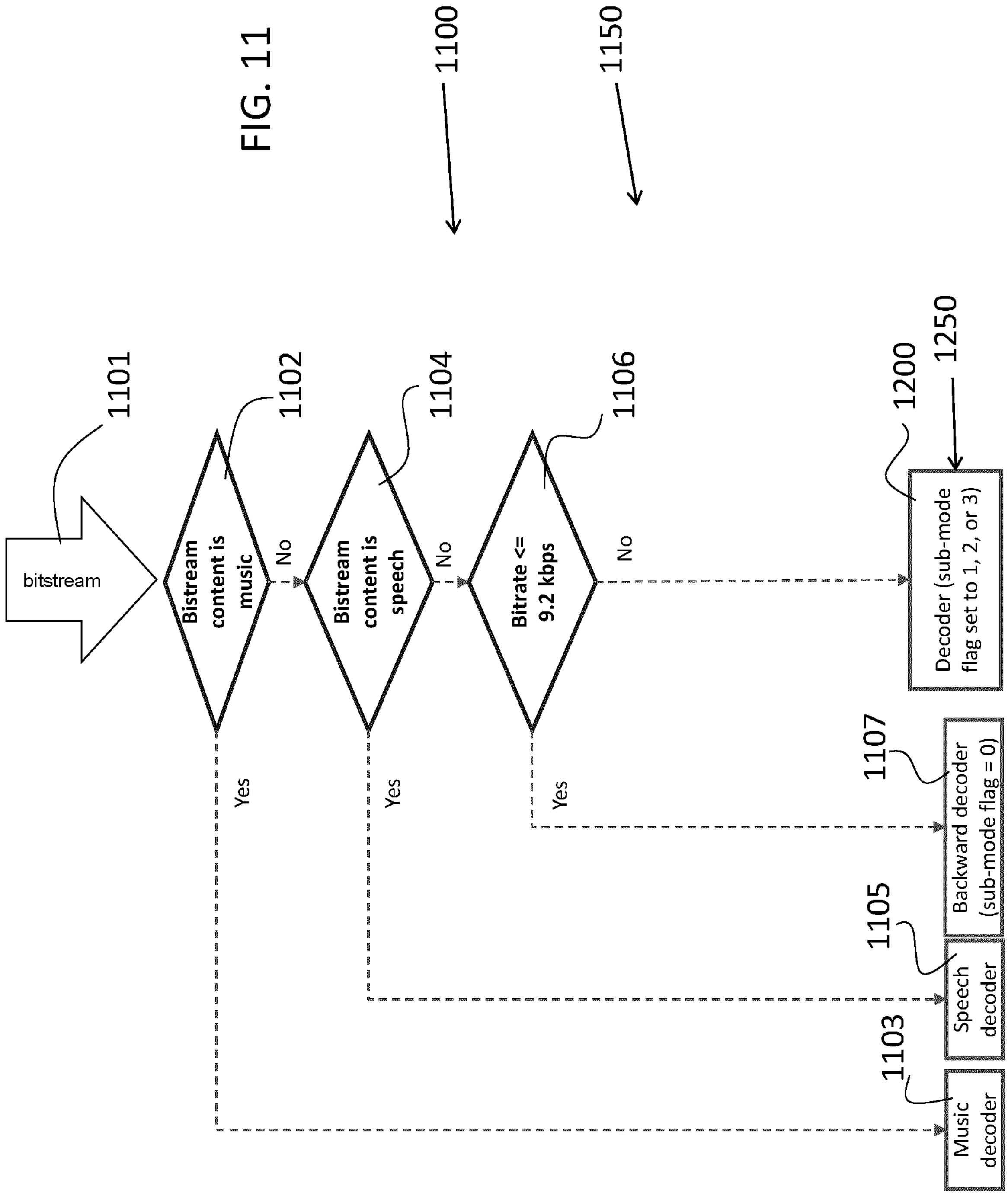
FIG. 11 is a schematic block diagram illustrating concurrently a decoder device 1100 and corresponding decoding method 1150 for decoding a bitstream from the unified time-domain/frequency-domain coding device and corresponding unified time-domain/frequency-domain coding method of FIG. 7.

FIG. 11 is a schematic block diagram illustrating concurrently a decoder device 1100 and corresponding decoding method 1150 for decoding a bitstream 1101 from the above described unified time-domain/frequency-domain coding device 700 and corresponding unified time-domain/frequency-domain coding method 750.

The decoder device 1100 comprises a receiver (not shown) for receiving the bitstream 1101 from the unified time-domain/frequency-domain coding device 700.

If the sound signal coded by the unified time-domain/frequency-domain coding device 700 has been classified as "music", this is indicated in the bitstream 1101 by corresponding signaling bits and detected by the decoder device 1100 (see 1102). The received bitstream 1101 is then decoded by a "music" decoder 1103, for example a frequency-domain decoder.

If the sound signal coded by the unified time-domain/frequency-domain coding device 700 has been classified as "speech", this is indicated in the bitstream 1101 by corresponding signaling bits and detected by the decoder device 1100 (see 1104). The received bitstream 1101 is then decoded by a "speech" decoder 1105, for example a time-domain decoder using ACELP (Algebraic Code-Excited Linear Prediction) or more generally CELP (Code-Excited Linear Prediction).

If the sound signal coded by the unified time-domain/frequency-domain coding device 700 has not been classified either as "music" or "speech" (see 1102 and 1104) and the bitrate available for coding the sound signal was equal to or lower than 9.2 kbps (see 1106), this is indicated in the bitstream by the sub-mode flag $F_{tfsm}$ set to "0". The received bitstream 1101 is then decoded using the backward coding mode, i.e. the legacy unified time-domain and frequency-domain coding model of FIGS. 1 and 2 (EVS) as shown at 1107.

Finally, if the sound signal coded by the unified time-domain/frequency-domain coding device 700 has not been classified either as "music" or "speech" (see 1102 and 1104) and the bitrate available for coding the sound signal was higher than 9.2 kbps (see 1106), this is indicated in the bitstream 1101 by a sub-mode flag $F_{tfsm}$ set to "1", "2" or "3". The received bitstream 1101 is then decoded using the sound signal decoder 1200 and corresponding sound signal decoding method 1250 of FIG. 12.

7.1) Sound Signal Decoder and Decoding Method

Figure 12:
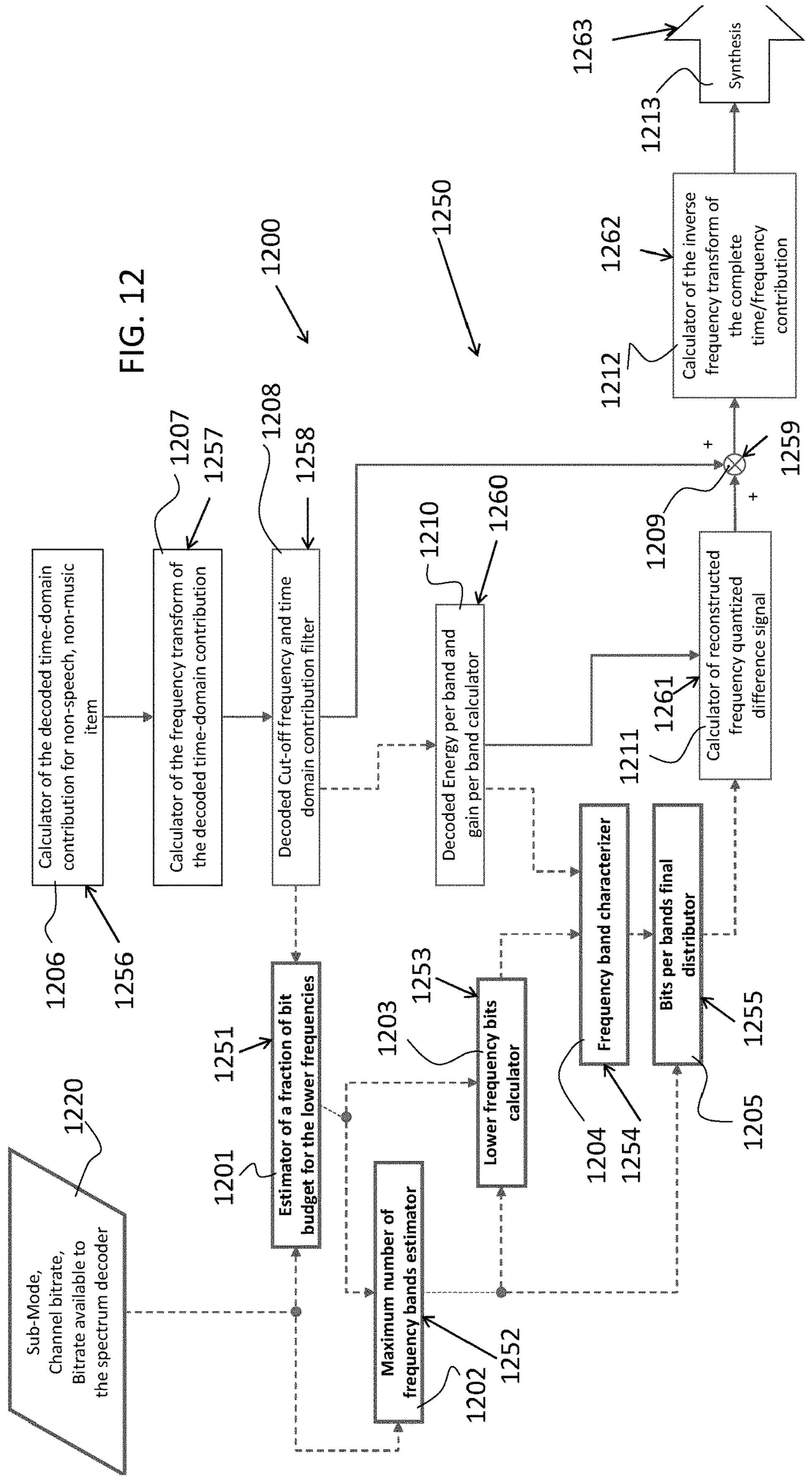
FIG. 12 is a schematic block diagram illustrating concurrently a sound signal decoder and corresponding sound signal decoding method for decoding a bitstream from the unified time-domain/frequency-domain coding device and corresponding unified time-domain/frequency-domain coding method in the case of a sound signal classified in an unclear signal type category.

FIG. 12 is a schematic block diagram illustrating concurrently a sound signal decoder 1200 and corresponding sound signal decoding method 1250 for decoding a bitstream from the above described unified time-domain/frequency-domain coding device 700 and corresponding unified time-domain/frequency-domain coding method 750 in the case of a sound signal classified in the unclear signal type category.

As mentioned in the foregoing description, the adaptive-codebook index T and the adaptive-codebook gain b are quantized and transmitted, and therefore received in the bitstream by the receiver (not shown). In the same manner, when used, the fixed-codebook index and the fixed-codebook gain are also quantized and transmitted to the decoder, and therefore received in the bitstream 1101 by the receiver (not shown). The sound signal decoding method 1250 comprises an operation 1256 of calculating a decoded time-domain excitation contribution using the adaptive-codebook index and gain and, if used, the fixed-codebook index and gain as commonly made in the art of CELP coding. To perform operation 1256, the sound signal decoder 1200 comprises a calculator 126 of the decoded time-domain excitation contribution.

The sound signal decoding method 1250 also comprises an operation 1257 of calculating a frequency transform of the decoded time-domain excitation contribution using the same procedure as in operation 156 using a DCT transform. To perform operation 1257, the sound signal decoder 1200 comprises a calculator 1207 of the frequency transform of the decoded time-domain excitation contribution.

As mentioned in the foregoing description, a quantized version $f_{tcQ}$ of the cut-off frequency is transmitted to the decoder, and therefore received in the bitstream 1101 by the receiver (not shown). The sound signal decoding method 1250 comprises an operation 1258 of filtering the frequency transform of the time-domain excitation contribution from the calculator 1207 using the decoded cut-off frequency $f_{tcQ}$ recovered from the bitstream 1101 and a procedure which is the same or similar to previously described filtering operation 266. For completing operation 1258, the sound signal decoder 1200 comprises a filter 1208 of the frequency transform of the time-domain excitation contribution using the recovered cut-off frequency $f_{tcQ}$. Filter 1208 has the same, or to the least a similar structure as filter 216 of FIG. 2.

The filtered frequency transform of the time-domain excitation contribution from filter 1208 is supplied to a positive input of an adder 1209 performing a corresponding adding operation 1259.

The sound signal decoding method 1250 comprises an operation 1260 of calculating the decoded energy and gain per frequency band of the difference vector $f_d$. To perform operation 1260, the sound signal decoder 1200 comprises a calculator 1210. Specifically, the calculator 1210 de-quantizes, using procedures inverse to those as described in the present disclosure for the quantization, the quantized energy per frequency band and quantized gain per frequency band received in the bitstream 1101 by the receiver (not shown) from the unified time-domain/frequency-domain coding device 700.

The sound signal decoding method 1250 comprises an operation 1261 of recovering the frequency quantized difference vector $f_{dQ}$. To perform operation 1261, the sound signal decoder 1200 comprises a calculator 1211. The calculator 1211 extracts from the bitstream 1101 the quantized positions and signs of the frequency pulses and replicates the selection of the frequency bands to be used for quantization and the bit allocation in the different frequency bands as determined by the operation 757 and allocator 707 and employed by the unified time-domain/frequency-domain coding device 700 for coding the input sound signal. The calculator 1211 uses this replicated information to recover the frequency quantized difference vector $f_{dQ}$ from the extracted frequency pulse quantized positions and signs. Specifically, for that purpose, the sound signal decoder 1200 replicates the procedure used in the unified time-domain/frequency-domain coding device 700 as illustrated in FIG. 9 in response to the number of bits (bitrate) available in the decoder 1200 for the frequency quantized difference vector $f_{dQ}$ (see 1220), the total bitrate available to the channel under processing (see 1220), and the sub-mode flag (see 1220). Specifically:

- the estimator 1201 and operation 1251 of FIG. 12 correspond to the estimator 901 and operation 951 of FIG. 9, for pre-fixing a fraction of the available bit budget for quantizing the lower frequencies of the difference vector $f_d$ as a function of the quantized cut-off frequency $f_{tcQ}$.
- The estimator 1202 and operation 1252 of FIG. 12 correspond to the estimator 902 and operation 952 of FIG. 9, for estimating the maximum number $N_{Bmx}$ of frequency bands of the quantized difference vector $f_{dQ}$.
- The calculator 1203 and operation 1253 of FIG. 12 correspond to the calculator 903 and operation 953 of FIG. 9, for calculating lower frequency bits.

The characterizer 1204 and operation 1254 of FIG. 12 correspond to the characterizer 904 and operation 954 of FIG. 9, for frequency band characterization.

The distributor 1205 and operation 1255 of FIG. 12 correspond to the distributor 905 and operation 955 of FIG. 9, for final distribution of bits per frequency band.

The sound signal decoding method 1250 comprises an operation 1259 of adding the recovered frequency quantized difference vector $f_{dQ}$ from calculator 1211 and the frequency-transformed and filtered time-domain excitation contribution $f_{excF}$ from the filter 1208 to form the mixed time-domain/frequency-domain excitation.

As can be appreciated, the estimators 1201 and 1202, calculator 1203, characterizer 1204, distributor 1205, calculators 1206 and 1207, filter 1208, calculators 1210 and 1211, and adder 1212 form a re-constructor of the mixed time-domain/frequency-domain excitation using information conveyed in the bitstream 1101, including the sub-mode flag identifying of one of the coding sub-modes selected and used for coding the sound signal classified in the unclear signal type category.

In the same manner, the operations 1251-1261 form a method of reconstructing the mixed time-domain/frequency-domain excitation using the information conveyed in the bitstream 1101.

The sound signal decoder 1200 comprises a converter 1212 to perform an operation 1262 of transforming the mixed time-domain/frequency-domain excitation back to time-domain using for example the IDCT (Inverse DCT) 220.

Finally, the synthesized sound signal is computed in the decoder 1200 by an operation 1263 of filtering through a LP (Linear Prediction) synthesis filter 1213 the total excitation from the converter 1212. Of course, LP parameters required by the decoder 1200 to reconstruct the synthesis filter 1213 are transmitted from the unified time-domain/frequency-domain coding device 700 and extracted from the bitstream 1101 as well known in the art of CELP coding.

8) HARDWARE IMPLEMENTATION

Figure 10:
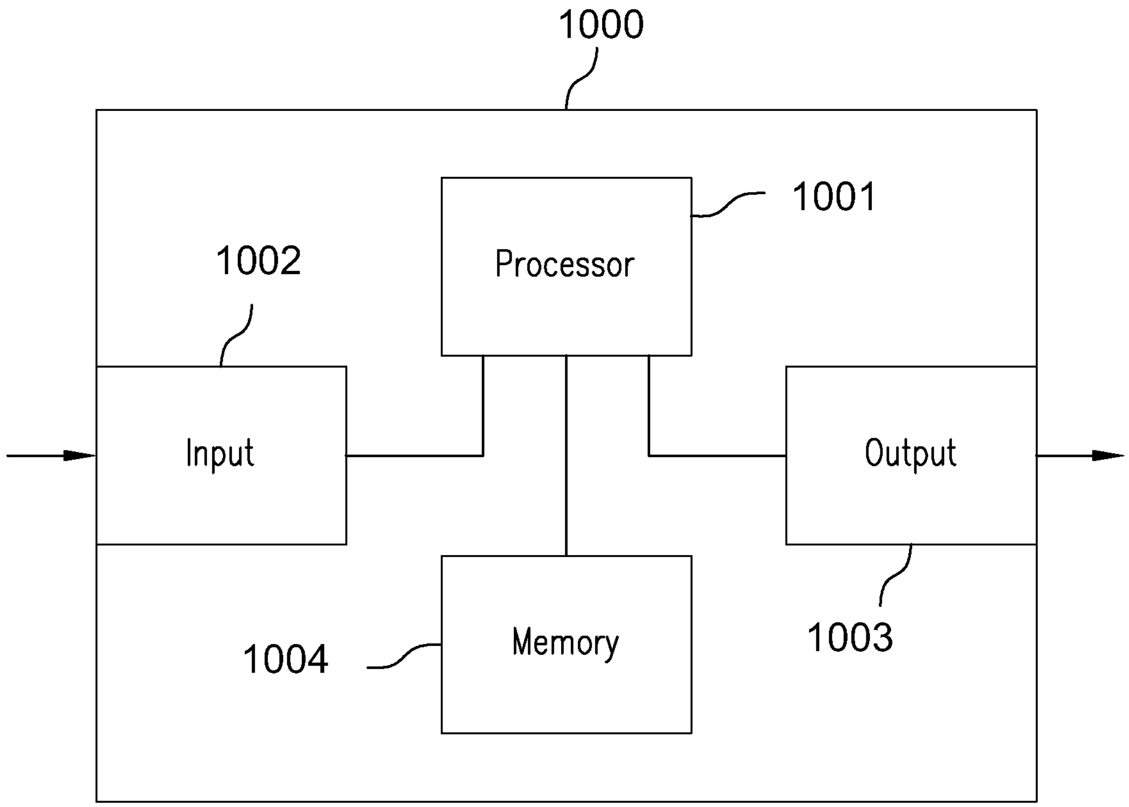
FIG. 10 is a simplified block diagram of an example configuration of hardware components forming the unified time-domain/frequency-domain coding device and method for coding an input sound signal.

FIG. 10 is a simplified block diagram of an example configuration of hardware components forming the above described unified time-domain/frequency-domain coding device 100/700 and method 150/750, decoder device 1100 and decoding method 1150.

The unified time-domain/frequency-domain coding device 100/700 and the decoder device 1100 may be implemented as a part of a mobile terminal, as a part of a portable media player, or in any similar device. The device 100/700 and decoder device 1100 (identified as 1000 in FIG. 10) comprises an input 1002, an output 1003, a processor 1001 and a memory 1004.

The input 1002 is configured to receive the input sound signal 101/bitstream 1101 of FIGS. 1 and 7, in digital or analog form. The output 1003 is configured to supply the output signal. The input 1002 and the output 1003 may be implemented in a common module, for example a serial input/output device.

The processor 1001 is operatively connected to the input 1002, to the output 1003, and to the memory 1004. The processor 1001 is realized as one or more processors for executing code instructions in support of the functions of the various components of the unified time-domain/frequency-domain coding device 100/700 for coding an input sound signal as illustrated in FIGS. 1-9, or of the decoder device 1100 of FIGS. 11-12.

The memory 1004 may comprise a non-transient memory for storing code instructions executable by the processor(s) 1001, specifically, a processor-readable memory comprising/storing non-transitory instructions that, when executed, cause a processor(s) to implement the operations and components of the unified time-domain/frequency-domain coding device 100/700 and method 150/750 and the decoder device 1100 and decoding method 1150 described in the present disclosure. The memory 1004 may also comprise a random access memory or buffer(s) to store intermediate processing data from the various functions performed by the processor(s) 1001.

Those of ordinary skill in the art will realize that the description of the unified time-domain/frequency-domain coding device 100/700 and method 150/750 and the decoder device 1100 and decoding method 1150 is illustrative only and is not intended to be in any way limiting. Other embodiments will readily suggest themselves to such persons with ordinary skill in the art having the benefit of the present disclosure. Furthermore, the disclosed unified time-domain/frequency-domain coding device 100/700 and method 150/750, decoder device 1100 and decoding method 1150 may be customized to offer valuable solutions to existing needs and problems of encoding and decoding sound.

In the interest of clarity, not all of the routine features of the implementations of the unified time-domain/frequency-domain coding device 100/700 and method 150/750 and the decoder device 1100 and decoding method 1150 are shown and described. It will, of course, be appreciated that in the development of any such actual implementation of the unified time-domain/frequency-domain coding device 100/700 and method 150/750 and the decoder device 1100 and decoding method 1150, numerous implementation-specific decisions may need to be made in order to achieve the developer's specific goals, such as compliance with application-, system-, network- and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of sound processing having the benefit of the present disclosure.

In accordance with the present disclosure, the components/processors/modules, processing operations, and/or data structures described herein may be implemented using various types of operating systems, computing platforms, network devices, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used. Where a method comprising a series of operations and sub-operations is implemented by a processor, computer or a machine and those operations and sub-operations may be stored as a series of non-transitory code instructions readable by the processor, computer or machine, they may be stored on a tangible and/or non-transient medium.

The unified time-domain/frequency-domain coding device 100/700 and method 150/750 and the decoder device 1100 and decoding method 1150 as described herein may use software, firmware, hardware, or any combination(s) of software, firmware, or hardware suitable for the purposes described herein.

In the unified time-domain/frequency-domain coding device 100/700 and method 150/750 and the decoder device 1100 and decoding method 1150 as described herein, the various operations and sub-operations may be performed in various orders and some of the operations and sub-operations may be optional.

Although the present disclosure has been described hereinabove by way of non-restrictive, illustrative embodiments thereof, these embodiments may be modified at will within the scope of the appended claims without departing from the spirit and nature of the present disclosure.

9) REFERENCES

The present disclosure mentions the following references, of which the full content is incorporated herein by reference:

[1] U.S. Pat. No. 9,015,038, "Coding generic audio signals at low bit rate and low delay".

[2] 3GPP TS 26.445, v.12.0.0, "Codec for Enhanced Voice Services (EVS); Detailed Algorithmic Description", September 2014.

[3] 3GPP SA4 contribution S4-170749 "New WID on EVS Codec Extension for Immersive Voice and Audio Services", SA4 meeting #94, Jun. 26-30, 2017, http://www.3gpp.org/ftp/tsg_sa/WG4_CODEC/TSGS4_94/Docs/S4-170749.zip

[4] U.S. Patent provisional application 63/010,798, "Method and device for speech/music classification and core encoder selection in a sound codec".

[5] ITU-T Recommendation G.718 "Frame error robust narrow-band and wideband embedded variable bit-rate coding of speech and audio from 8-32 kbit/s", June 2008.

[6] T. Vaillancourt et al., "Inter-tone noise reduction in a low bit rate CELP decoder," *IEEE Proceedings of International Conference on Acoustics, Speech and Signal Processing* (*ICASSP*), Taipei, Taiwan, April 2009, pp. 4113-16.

[7] V. Eksler, and M. Jelínek, "Transition mode coding for source controlled CELP codecs", *IEEE Proceedings of International Conference on Acoustics, Speech and Signal Processing* (*ICASSP*), March-April 2008, pp. 4001-4043.

[8] U. Mittal, J. P. Ashley, and E. M. Cruz-Zeno, "Low Complexity Factorial Pulse Coding of MDCT Coefficients using Approximation of Combinatorial Functions", *IEEE Proceedings of International Conference on Acoustics, Speech and Signal Processing* (*ICASSP*), Taipei, Taiwan, April 2007, pp. 289-292.

What is claimed is:

1. A coding device capable of operating in time domain and frequency domain for coding an input sound signal, comprising:

at least one processor; and a memory coupled to the processor and storing non-transitory instructions that when executed cause the processor to implement:

a classifier of the input sound signal into one of a plurality of sound signal categories, wherein the sound signal categories comprise a speech category, a music category and a signal type category showing that the input sound signal is not classified as speech nor music;

a selector of one of a plurality of coding sub-modes for coding the input sound signal if the input sound signal is classified in the signal type category showing that the input sound signal is not classified as speech nor music, wherein the plurality of coding sub-modes are designed for coding the input sound signal classified in the signal type category showing that the input sound signal is not classified as speech nor music; and an encoder configured to calculate and mix time domain and frequency domain contributions for coding the input sound signal using the selected coding sub-mode.

2. The coding device according to claim 1, wherein the selector selects the coding sub-mode in response to a bitrate for coding the input sound signal and characteristics of the input sound signal classified in the signal type category showing that the input sound signal is not classified as speech nor music.

3. The coding device according to claim 1, wherein the coding sub-modes are identified by respective sub-mode flags.

4. The coding device according to claim 1, wherein the selector selects a backward coding sub-mode using a legacy time domain and frequency domain coding model for coding the input sound signal if (a) a bitrate available for coding the input sound signal is not higher than a given value and (b) the input sound signal is classified in the signal type category showing that the input sound signal is not classified as speech nor music.

5. The coding device according to claim 1, wherein the selector selects a given one of the coding sub-modes if speech is detected in the input sound signal.

6. The coding device according to claim 5, wherein the selector selects the given one of the coding sub-modes if (a) the input sound signal is classified in the signal type category showing that the input sound signal is not classified as speech nor music by the classifier and a bitrate available for coding the input sound signal is higher than a first given value, (b) a probability of the input sound signal of being music is not greater than a second given value, and (c) no temporal attack is detected in a current frame of the input sound signal.

7. The coding device according to claim 1, wherein the selector selects a given one of the coding sub-modes if a temporal attack is detected in the input sound signal.

8. The coding device according to claim 7, wherein the selector selects the given one of the coding sub-modes if (a) the input sound signal is classified in the signal type category showing that the input sound signal is not classified as speech nor music by the classifier and a bitrate available for coding the input sound signal is higher than a first given value, (b) a probability of the input sound signal of being music is not greater than a second given value, and (c) a temporal attack is detected in a current frame of the input sound signal.

9. The coding device according to claim 1, wherein the selector selects a given one of the coding sub-modes if music is detected in the input sound signal.

10. The coding device according to claim 9, wherein the selector selects the given one of the coding sub-modes if (a) the input sound signal is classified in the signal type category showing that the input sound signal is not classified as speech nor music by the classifier and a bitrate available for coding the input sound signal is higher than a first given value, and (b) a probability of the input sound signal of being music is greater than a second given value.

11. The coding device according to claim 1, wherein:

the selector selects a first coding sub-mode if speech is detected in the input sound signal;

the selector selects a second coding sub-mode if a temporal attack is detected in the input sound signal; and the selector selects a third coding sub-mode if music is detected in the input sound signal.

12. The coding device according to claim 11, wherein the selector selects (a) in the third coding sub-mode, a given number of sub-frames by frame for coding the input sound signal and (b) in the first and second coding sub-modes, a number of sub-frames smaller than the given number and depending on a bitrate available for coding the input sound signal.

13. A coding method capable of operating in time domain and frequency domain for coding an input sound signal, comprising:

classifying the input sound signal into one of a plurality of sound signal categories, wherein the sound signal categories comprise a speech category, a music category and a signal type category showing that the input sound signal is not classified as speech nor music;

selecting one of a plurality of coding sub-modes for coding the input sound signal if the input sound signal is classified in the signal type category showing that the input sound signal is not classified as speech nor music, wherein the plurality of coding sub-modes are designed for coding the input sound signal classified in the signal type category showing that the input sound signal is not classified as speech nor music; and coding the input sound signal using the selected coding sub-mode, comprising calculating and mixing time domain and frequency domain contributions for coding the sound signal.

14. The coding method according to claim 13, wherein selecting one of a plurality of coding sub-modes comprises selecting the coding sub-mode in response to a bitrate for coding the input sound signal and characteristics of the input sound signal classified in the unclear signal type category showing that the input sound signal is not classified as speech nor music.

15. The coding method according to claim 13, comprising identifying the coding sub-modes by respective sub-mode flags.

16. The coding method according to claim 13, wherein selecting one of a plurality of coding sub-modes comprises selecting a backward coding sub-mode using a legacy time domain and frequency domain coding model for coding the input sound signal if (a) a bitrate available for coding the input sound signal is not higher than a given value and (b) the input sound signal is classified in the signal type category showing that the input sound signal is not classified as speech nor music.

17. The coding method according to claim 13, wherein selecting one of a plurality of coding sub-modes comprises selecting a given one of the coding sub-modes if speech is detected in the input sound signal.

18. The coding method according to claim 17, wherein the given one of the coding sub-modes is selected if (a) the input sound signal is classified in the signal type category showing that the input sound signal is not classified as speech nor music and a bitrate available for coding the input sound signal is higher than a first given value, (b) a probability of the input sound signal of being music is not greater than a second given value, and (c) no temporal attack is detected in a current frame of the input sound signal.

19. The coding method according to claim 13, wherein selecting one of a plurality of coding sub-modes comprises selecting a given one of the coding sub-modes if a temporal attack is detected in the input sound signal.

20. The coding method according to claim 19, wherein the given one of the coding sub-modes is selected if (a) the input sound signal is classified in the signal type category showing that the input sound signal is not classified as speech nor music and a bitrate available for coding the input sound signal is higher than a first given value, (b) a probability of the input sound signal of being music is not greater than a second given value, and (c) a temporal attack is detected in a current frame of the input sound signal.

21. The coding method according to claim 13, wherein selecting one of a plurality of coding sub-modes comprises selecting a given one of the coding sub-modes if music is detected in the input sound signal.

22. The coding method according to claim 21, wherein the given one of the coding sub-modes is selected if (a) the input sound signal is classified in the signal type category showing that the input sound signal is not classified as speech nor music and a bitrate available for coding the input sound signal is higher than a first given value, and (b) a probability of the input sound signal of being music is greater than a second given value.

23. The coding method according to claim 13, wherein selecting one of a plurality of coding sub-modes comprises selecting:

a first coding sub-mode if speech is detected in the input sound signal;

a second coding sub-mode if a temporal attack is detected in the input sound signal; and a third coding sub-mode if music is detected in the input sound signal.

24. The coding method according to claim 23, wherein selecting one of a plurality of coding sub-modes comprises selecting (a) in the third coding sub-mode, a given number of sub-frames by frame for coding the input sound signal and (b) in the first and second coding sub-modes, a number of sub-frames smaller than the given number and depending on a bitrate available for coding the input sound signal.

25. A coding device capable of operating in time domain and frequency domain for coding an input sound signal, comprising:

a classifier of the input sound signal into one of a plurality of sound signal categories, wherein the sound signal categories comprise a speech category, a music category and a signal type category showing that the input sound signal is not classified as speech nor music;

a selector of one of a plurality of coding sub-modes for coding the input sound signal if the input sound signal is classified in the signal type category showing that the input sound signal is not classified as speech nor music, wherein the plurality of coding sub-modes are designed for coding the input sound signal classified in the signal type category showing that the input sound signal is not classified as speech nor music; and an encoder configured to calculate and mix both time domain and frequency domain contributions for coding the input sound signal using the selected coding sub-mode.

26. A coding device capable of operating in time domain and frequency domain for coding an input sound signal, comprising:

at least one processor; and a memory coupled to the processor and storing non-transitory instructions that when executed cause the processor to:

classify the input sound signal into one of a plurality of sound signal categories, wherein the sound signal categories comprise a speech category, a music category and a signal type category showing that the input sound signal is not classified as speech nor music;

select one of a plurality of coding sub-modes for coding the input sound signal if the input sound signal is classified in the signal type category showing that the input sound signal is not classified as speech nor music, wherein the plurality of coding sub-modes are designed for coding the input sound signal classified in the signal type category showing that the input sound signal is not classified as speech nor music; and code the input sound signal using the selected coding sub-mode, comprising calculating and mixing time domain and frequency domain contributions for coding the input sound signal.

27. A sound signal decoder comprising:

at least one processor; and a memory coupled to the processor and storing non-transitory instructions that when executed cause the processor to implement:

a receiver of a bitstream conveying information usable to reconstruct a synthesis filter excitation formed from time domain and frequency domain excitation contributions and representative of a sound signal classified in a signal type category showing that the sound signal is not classified as speech nor music, wherein the information includes one of a plurality of coding sub-modes used for coding the sound signal classified in the unclear signal type category showing that the sound signal is not classified as speech nor music and wherein the plurality of coding sub-modes are designed for coding the sound signal classified in the signal type category showing that the sound signal is not classified as speech nor music;

a re-constructor of the synthesis filter excitation in response to the information conveyed in the bitstream, including the coding sub-mode used for coding the sound signal;

a converter of the synthesis filter excitation to time domain; and a synthesis filter for filtering the synthesis filter excitation converted to time domain to produce a synthesized version of the sound signal.

28. The sound signal decoder according to claim 27, wherein the said one coding sub-mode is identified in the bitstream by a sub-mode flag.

29. The sound signal decoder according to claim 27, wherein the coding sub-modes comprise (a) a first coding sub-mode if the sound signal contains speech, (b) a second coding sub-mode if the sound signal contains a temporal attack, and (c) a third coding sub-mode if the sound signal contains music.

30. The sound signal decoder according to claim 27, wherein the re-constructor recovers from the information conveyed in the bitstream a frequency representation of the time domain excitation contribution, reconstructs a frequency-quantized difference vector between the frequency domain excitation contribution and the frequency representation of the time domain excitation contribution, and adds the frequency-quantized difference vector to the frequency representation of the time domain excitation contribution to produce the synthesis filter excitation.

31. A sound signal decoding method comprising:

receiving a bitstream conveying information usable to reconstruct a synthesis filter excitation formed from time domain and frequency domain excitation contributions and representative of a sound signal classified in a signal type category showing that the sound signal is not classified as speech nor music, wherein the information includes one of a plurality of coding sub-modes used for coding the sound signal classified in the signal type category showing that the sound signal is not classified as speech nor music and wherein the plurality of coding sub-modes are designed for coding the sound signal classified in the signal type category showing that the sound signal is not classified as speech nor music;

reconstructing the synthesis filter excitation in response to the information conveyed in the bitstream, including the coding sub-mode used for coding the sound signal;

converting the synthesis filter excitation to time domain; and filtering the synthesis filter excitation converted to time domain through a synthesis filter to produce a synthesized version of the sound signal.

32. The sound signal decoding method according to claim 31, wherein the said one coding sub-mode is identified in the bitstream by a sub-mode flag.

33. The sound signal decoding method according to claim 31, wherein the coding sub-modes comprise (a) a first coding sub-mode if the sound signal contains speech, (b) a second coding sub-mode if the sound signal contains a temporal attack, and (c) a third coding sub-mode if the sound signal contains music.

34. The sound signal decoding method according to claim 31, wherein reconstructing the synthesis filter excitation comprises recovering from the information conveyed in the bitstream a frequency representation of the time domain excitation contribution, reconstructing from the information conveyed in the bitstream a frequency-quantized difference vector between the frequency domain excitation contribution and the frequency representation of the time domain excitation contribution, and adding the frequency-quantized difference vector to the frequency representation of the time domain excitation contribution to produce the synthesis filter excitation.

35. A sound signal decoder comprising:

a receiver of a bitstream conveying information usable to reconstruct a synthesis filter excitation formed from time domain and frequency domain excitation contributions and representative of a sound signal classified in a signal type category showing that the sound signal is not classified as speech nor music, wherein the information includes one of a plurality of coding sub-modes used for coding the sound signal classified in the signal type category showing that the sound signal is not classified as speech nor music and wherein the plurality of coding sub-modes are designed for coding the sound signal classified in the signal type category showing that the sound signal is not classified as speech nor music;

a re-constructor of the synthesis filter excitation in response to the information conveyed in the bitstream, including the coding sub-mode used for coding the sound signal;

a converter of the synthesis filter excitation to time domain; and a synthesis filter for filtering the synthesis filter excitation converted to time domain to produce a synthesized version of the sound signal.

36. A sound signal decoder comprising:

at least one processor; and a memory coupled to the processor and storing non-transitory instructions that when executed cause the processor to:

receive a bitstream conveying information usable to reconstruct a synthesis filter excitation formed from time domain and frequency domain excitation contributions and representative of a sound signal classified in a signal type category showing that the sound signal is not classified as speech nor music, wherein the information includes one of a plurality of coding sub-modes used for coding the sound signal classified in the signal type category showing that the sound signal is not classified as speech nor music and wherein the plurality of coding sub-modes are designed for coding the sound signal classified in the signal type category showing that the sound signal is not classified as speech nor music;

reconstruct the synthesis filter excitation in response to the information conveyed in the bitstream, including the coding sub-mode used for coding the sound signal;

convert the synthesis filter excitation to time domain; and filter the synthesis filter excitation converted to time domain through a synthesis filter to produce a synthesized version of the sound signal.

* * * * *